US008747196B2

(12) United States Patent
Rosenberg et al.

(10) Patent No.: US 8,747,196 B2
(45) Date of Patent: *Jun. 10, 2014

(54) FORCE FEEDBACK DEVICE FOR SIMULATING COMBAT

(75) Inventors: Louis B. Rosenberg, Pleasanton, CA (US); Scott B. Brave, Stanford, CA (US)

(73) Assignee: Immersion Corporation, San Jose, CA (US)

( * ) Notice: Subject to any disclaimer, the term of this patent is extended or adjusted under 35 U.S.C. 154(b) by 1739 days.

This patent is subject to a terminal disclaimer.

(21) Appl. No.: 11/233,563

(22) Filed: Sep. 22, 2005

(65) Prior Publication Data

US 2006/0030383 A1 Feb. 9, 2006

Related U.S. Application Data

(63) Continuation of application No. 09/934,739, filed on Aug. 22, 2001, now Pat. No. 7,158,112, which is a continuation of application No. 09/433,657, filed on Nov. 3, 1999, now Pat. No. 6,366,272, which is a continuation of application No. 08/664,086, filed on Jun. 14, 1996, now Pat. No. 6,028,593, which is a continuation-in-part of application No. 08/566,282, filed on Dec. 1, 1995, now Pat. No. 5,734,373, and a continuation-in-part of application No. 08/571,606, filed on Dec. 13, 1995, now Pat. No. 6,219,032.

(60) Provisional application No. 60/017,803, filed on May 17, 1996.

(51) Int. Cl.
*A63F 13/00* (2014.01)

(52) U.S. Cl.
USPC ................ 463/1; 463/36; 463/37; 463/38

(58) Field of Classification Search
CPC .................................................. A63F 13/00
USPC ........ 318/568.11; 341/20; 345/156, 157, 161,
345/420; 463/36–38, 1
See application file for complete search history.

(56) References Cited

U.S. PATENT DOCUMENTS 4,895,376 A * 1/1990 Chiang Shiung-Fei ........... 463/2
4,976,438 A * 12/1990 Tashiro et al. ................... 463/34

(Continued)

OTHER PUBLICATIONS

Dachille IX, Frank et al., "Haptic Sculpting of Dynamic Surfaces," Symposium on Interactive 3D Graphics, 1999, pp. 103-110.

(Continued)

*Primary Examiner* — Sam Yao
*Assistant Examiner* — Alvin Carlos
(74) *Attorney, Agent, or Firm* — Kilpatrick Townsend & Stockton LLP

(57) ABSTRACT

A method and apparatus for providing force feedback to a user operating a human/computer interface device and interacting with a computer-generated simulation. In one aspect, a computer-implemented method simulates the interaction of simulated objects displayed to a user who controls one of the simulated objects manipulating a physical object of an interface device. The position of the simulated object, as provided within the simulation and as displayed, is mapped directly to the physical position of the user object. This mapping is broken under conditions that are effective to provide force feedback to the user which imparts a physical sensation corresponding to the interaction of the simulated objects. In another aspect, hand-to-hand combat is simulated wherein a user controls a simulated object by manipulating a physical object, such a sword hilt, to allow the user to utilize a wide range of physical skill and dexterity in interacting with the simulation. In another aspect, a simulation apparatus provides a display device such as one or more display screens or a projection device, and which also provides an intuitive mechanical interface device for the user to skillfully and dexterously manipulate objects within a computer-generated simulation.

30 Claims, 18 Drawing Sheets

(56) References Cited

U.S. PATENT DOCUMENTS

| | | | |
|---|---|---|---|
| 4,988,981 A * | 1/1991 | Zimmerman et al. | 345/158 |
| 5,067,167 A * | 11/1991 | Berger | 382/277 |
| 5,184,319 A * | 2/1993 | Kramer | 703/5 |
| 5,313,230 A * | 5/1994 | Venolia et al. | 345/163 |
| 5,347,306 A * | 9/1994 | Nitta | 348/14.1 |
| 5,368,484 A * | 11/1994 | Copperman et al. | 434/69 |
| 5,389,865 A * | 2/1995 | Jacobus et al. | 318/568.11 |
| 5,396,266 A * | 3/1995 | Brimhall | 345/161 |
| 5,396,267 A * | 3/1995 | Bouton | 345/168 |
| 5,459,382 A * | 10/1995 | Jacobus et al. | 318/568.11 |
| 5,471,571 A | 11/1995 | Smith et al. | |
| 5,542,672 A * | 8/1996 | Meredith | 463/37 |
| 5,561,746 A * | 10/1996 | Murata et al. | 345/419 |
| 5,565,840 A * | 10/1996 | Thorner et al. | 340/407.1 |
| 5,570,111 A | 10/1996 | Barrett et al. | |
| 5,576,727 A * | 11/1996 | Rosenberg et al. | 345/179 |
| 5,589,828 A * | 12/1996 | Armstrong | 341/20 |
| 5,613,913 A * | 3/1997 | Ikematsu et al. | 463/52 |
| 5,616,078 A * | 4/1997 | Oh | 463/8 |
| 5,616,079 A * | 4/1997 | Iwase et al. | 463/32 |
| 5,625,575 A | 4/1997 | Goyal et al. | |
| 5,629,594 A | 5/1997 | Jacobus et al. | |
| 5,691,898 A | 11/1997 | Rosenberg et al. | |
| 5,692,117 A | 11/1997 | Berend et al. | |
| 5,696,532 A | 12/1997 | Caprara | |
| 5,696,535 A | 12/1997 | Rutledge et al. | |
| 5,701,140 A * | 12/1997 | Rosenberg et al. | 345/156 |
| 5,704,837 A * | 1/1998 | Iwasaki et al. | 463/38 |
| 5,709,219 A | 1/1998 | Chen et al. | |
| 5,731,804 A | 3/1998 | Rosenberg | |
| 5,739,811 A * | 4/1998 | Rosenberg et al. | 345/161 |
| 5,742,278 A | 4/1998 | Chen et al. | |
| 5,757,358 A | 5/1998 | Osga | |
| 5,767,839 A | 6/1998 | Rosenberg | |
| 5,802,353 A | 9/1998 | Avila et al. | |
| 5,808,601 A | 9/1998 | Leah et al. | |
| 5,816,823 A | 10/1998 | Naimark et al. | |
| 5,844,392 A | 12/1998 | Peurach et al. | |
| 5,889,670 A * | 3/1999 | Schuler et al. | 700/83 |
| 5,913,727 A * | 6/1999 | Ahdoot | 463/39 |
| 5,956,484 A | 9/1999 | Rosenberg et al. | |
| 5,959,613 A | 9/1999 | Rosenberg et al. | |
| 5,977,977 A | 11/1999 | Kajiya et al. | |
| 5,990,860 A | 11/1999 | Takeuchi | |
| 5,999,185 A * | 12/1999 | Kato et al. | 345/420 |
| 6,004,134 A * | 12/1999 | Marcus et al. | 434/45 |
| 6,028,593 A | 2/2000 | Rosenberg et al. | |
| 6,046,726 A | 4/2000 | Keyson | |
| 6,111,577 A | 8/2000 | Zilles et al. | |
| 6,131,097 A | 10/2000 | Peurach et al. | |
| 6,219,032 B1 | 4/2001 | Rosenberg et al. | |
| 6,326,964 B1 | 12/2001 | Snyder et al. | |
| 6,722,888 B1 * | 4/2004 | Macri et al. | 434/247 |
| 2001/0002126 A1 | 5/2001 | Rosenberg et al. | |

OTHER PUBLICATIONS

Erikson, Carl, "Polygonal Simplification: An Overview," Dept. of Computer Science, TR96-016, 1996, pp. 1-32.

Iwata, Hiroo, "Artificial Reality With Force-Feedback: Development of Desktop Virtual Space With Compact Master Manipulator," Computer Graphics, vol. 24, No. 4, Aug. 1990, pp. 165-170.

Minsky, Margaret et al., "Feeling and Seeing: Issues in Force Display," Dept. of Computer Science, 1990, pp. 235-242, 270.

Stanley, Michael C. et al., "Computer Simulation of Interacting Dynamic Mechanical Systems Using Distributed Memory Parallel Processors," DSC—vol. 42, Advances in Robotics, ASME 1992, pp. 55-61.

Su, S. Augustine et al., "The Virtual Panel Architecture: A 3D Gesture Framework," Computer Science Department, 1993, pp. 387-393.

Office Action in EPO Application No. 97 926 557.6-1245, mailed Mar. 10, 2010.

* cited by examiner

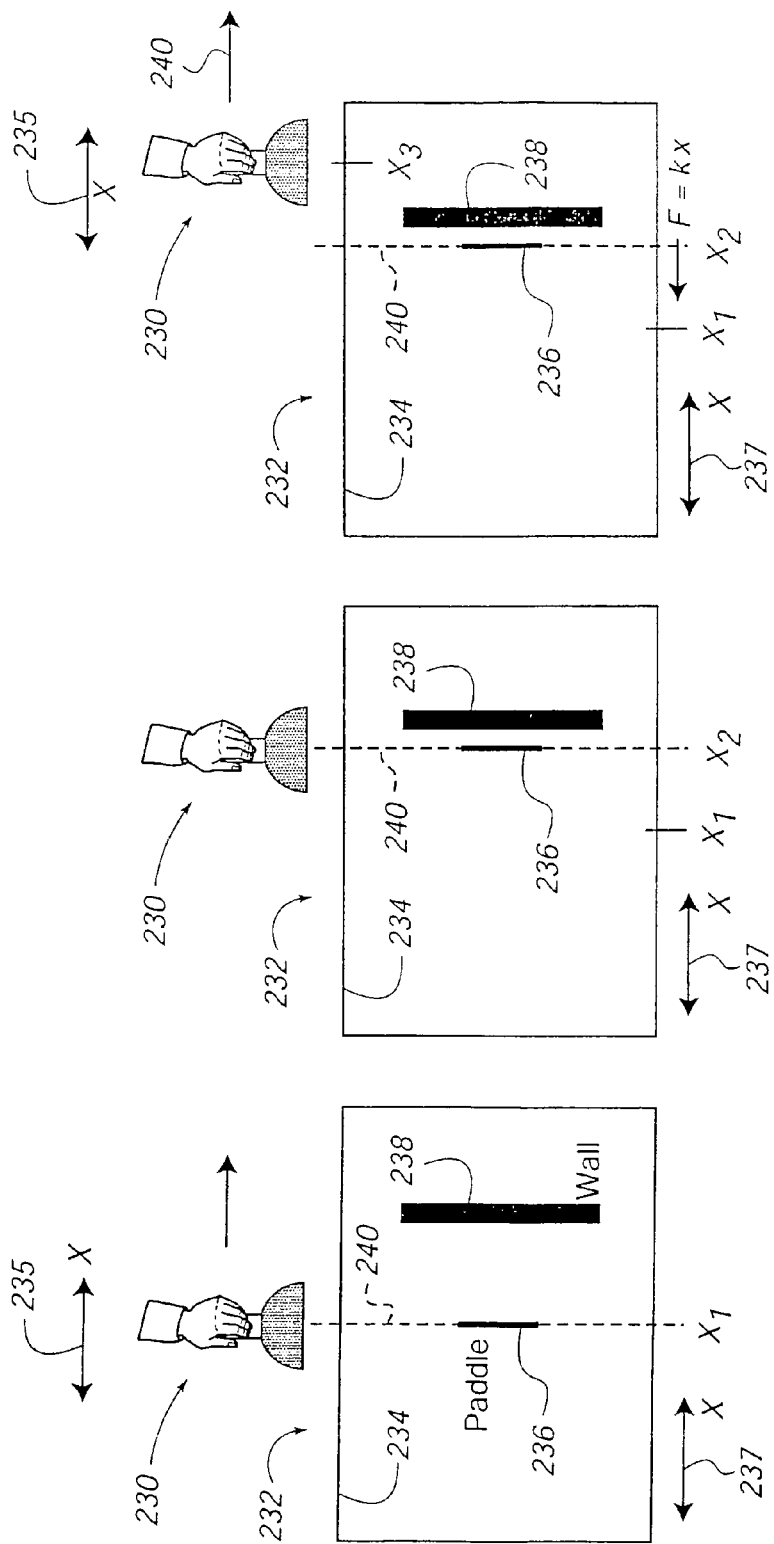

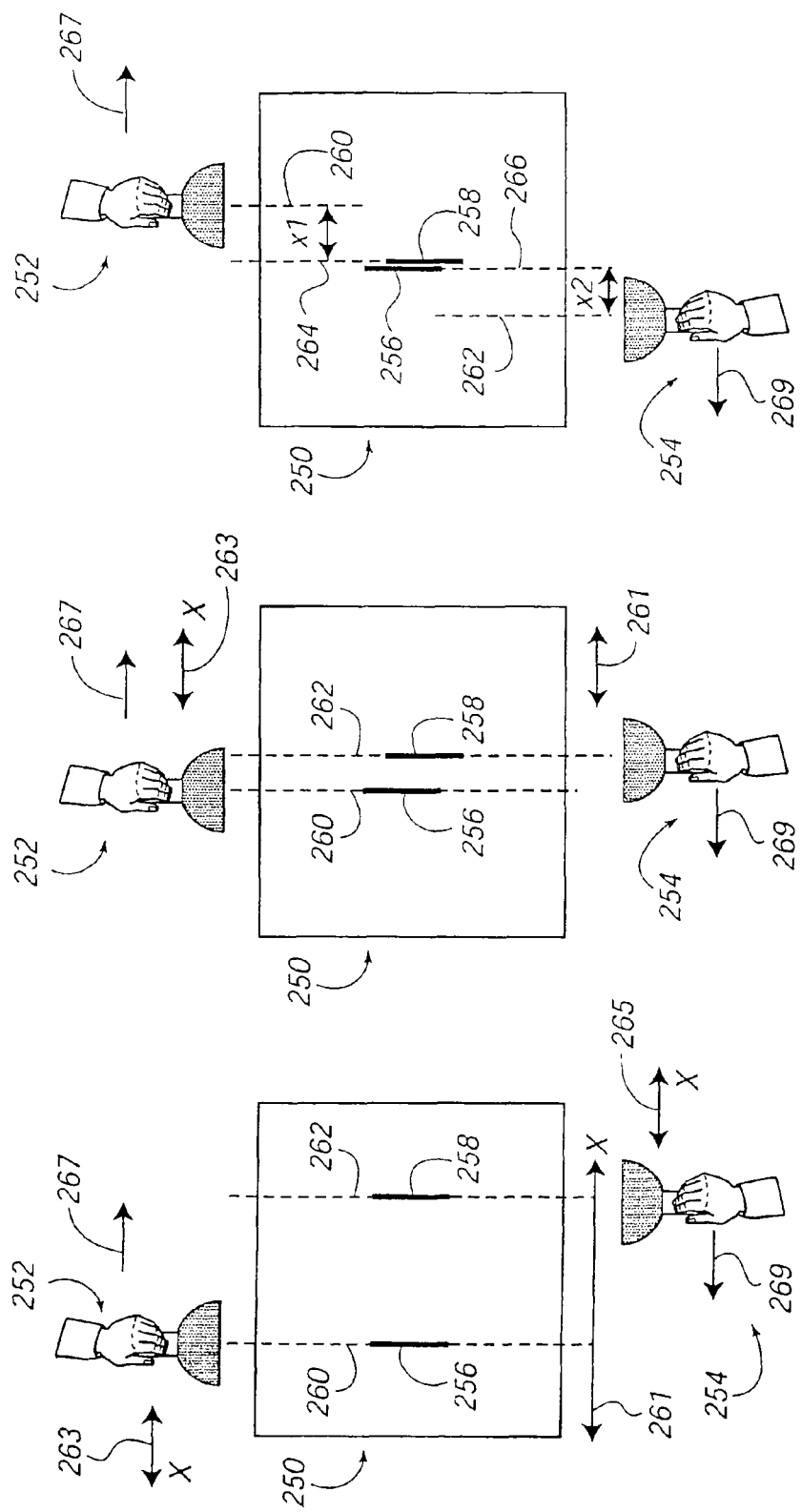

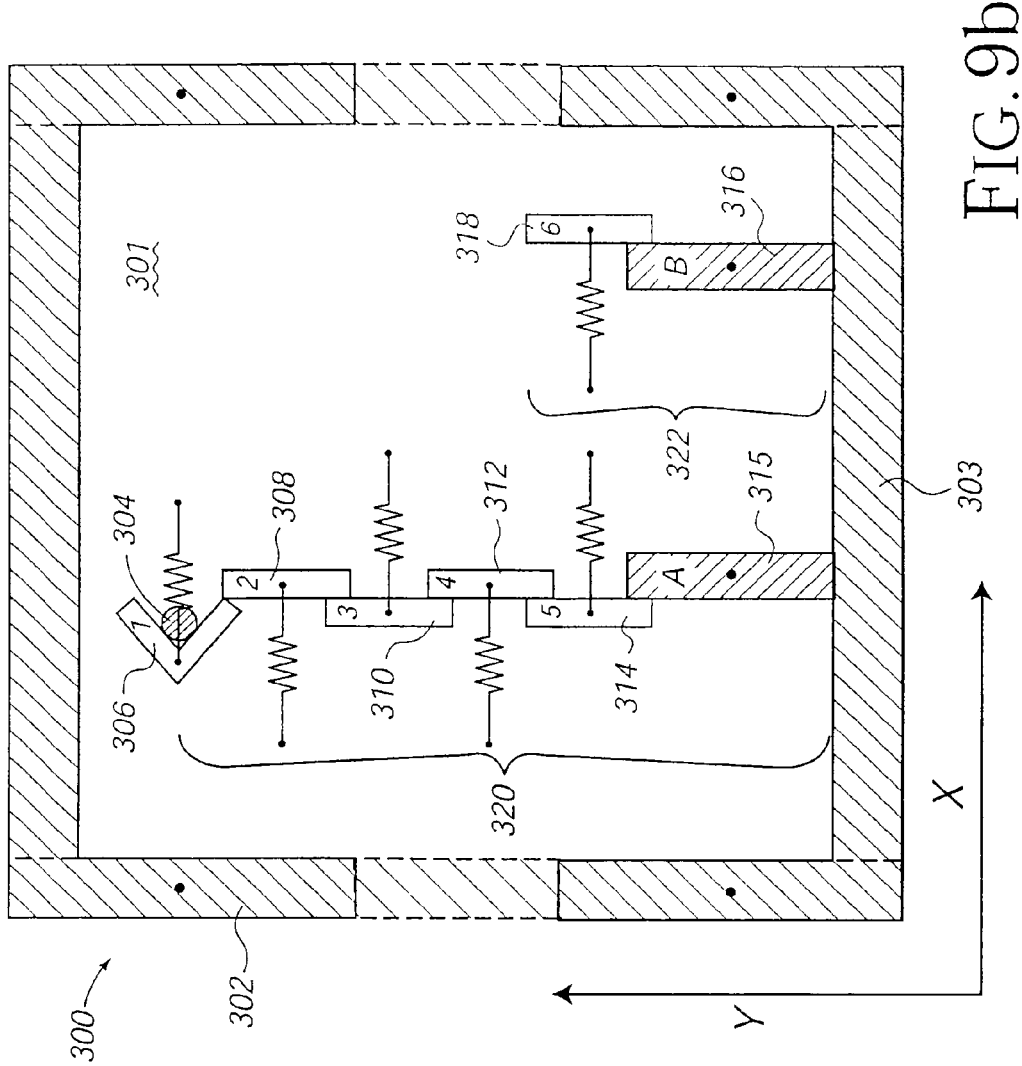
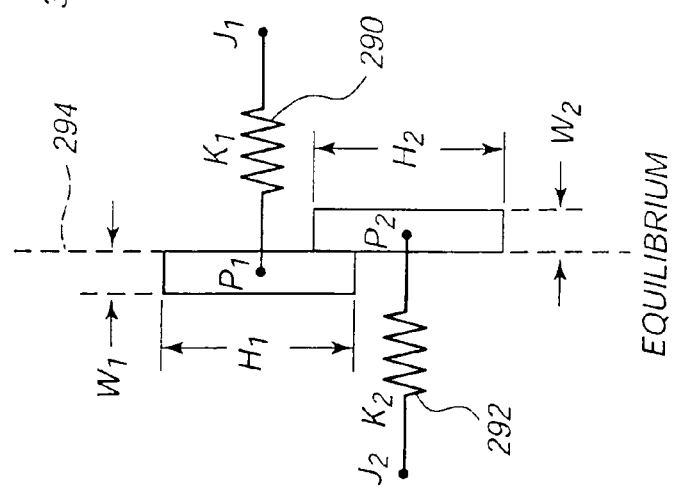
FIG. 9a
FIG. 9b

FORCE FEEDBACK DEVICE FOR SIMULATING COMBAT

CROSS-REFERENCE TO RELATED APPLICATIONS

The present application is a continuation of U.S. patent application Ser. No. 09/934,739, filed Aug. 22, 2001, now U.S. Pat. No. 7,158,112, on behalf of Rosenberg et al., which is a continuation of application Ser. No. 09/433,657, filed Nov. 3, 1999, now U.S. Pat. No. 6,366,272, which is a continuation of application Ser. No. 08/664,086, filed Jun. 14, 1996, now U.S. Pat. No. 6,028,593, which is a continuation-in-part of application Ser. No. 08/566,282, filed Dec. 1, 1995, now U.S. Pat. No. 5,734,373, and application Ser. No. 08/571,606, filed Dec. 13, 1995, now U.S. Pat. No. 6,219,032; and where said application Ser. No. 08/664,086 claims the benefit of provisional application 60/017,803, filed May 17, 1996, all of which are incorporated herein by reference for all purposes.

BACKGROUND OF THE INVENTION

The present invention relates generally to interface systems for allowing humans to interface naturally with computer systems and simulations, and, more particularly, to interface systems that allow a user to interact with computer simulated environments both visually and through haptic sensations.

Computer systems are used increasingly to provide simulated experiences to users, for purposes such as training, remote control and sensing, and entertainment. These systems typically include a visual display, such as a standard video monitor, through which visual information generated by the simulation is presented to the user. Virtual reality systems may also include more sophisticated visual displays, such as a head-mounted displays, which aid the user in becoming "immersed" into the simulated environment by attempting to remove any visual input to the user that is not being generated by the simulation. To further enhance the user's simulated experience, sound is provided through speakers or headphones that are connected to the computer system and provide aural information that is controlled by the simulation. In addition, interface devices commonly allow users to interact with the simulation through manual commands or gestures made by the user, i.e., the device tracks the user's "kinesthetic" activities. Keyboards, trackballs, mice, joysticks, pedals, steering wheels, and joypads are interface devices that allow human interaction with computer systems.

Typical human interface devices are input only: They track a users physical activities, but do not provide a means of presenting physical information back to the user. For example, a traditional computer joystick will allow a user to manipulate an object within a computer simulated environment. However, if that object encounters a simulated obstruction, the interaction will only be experienced visually (and maybe aurally through sound feedback), not physically. In other words, when a user manipulates a joystick and causes a computer generated object to encounter a computer generated obstruction, the user will not feel the physical sensation of one object hitting another object. Thus, the user is not truly "immersed" in the simulation as the user receives no physical feedback in conjunction with simulated experiences.

This missing feedback modality can be supplied by a force feedback interface device. A force feedback human interface device is a special class of manual human interface that not only tracks a user's manual gestures but also includes means of presenting physical sensations back to the user. A force feedback device typically includes sensors for tracking a user's motions and actuators for producing physical forces representative of the simulated interactions. Using a force feedback joystick, a user may manipulate a simulated object in a simulated environment such that if that object encounters forces or other simulated phenomena, the actuators in the device are commanded to simulate a sensation associated with the interaction. For example, if a user manipulates a force feedback joystick to control a simulated brick and causes the brick to contact a simulated piece of metal, the computer would generate forces on the joystick so that the user would feel a physical sensation representative of the encounter. Such physical feedback makes the computer-simulated environment significantly more realistic to the user.

One goal in developing realistic computer simulated environments is to allow users to take advantage of their natural manual dexterity and basic physical skills when interacting with computer simulations. When trying to create a simulated environment in which users can make use of their dexterous skills, it is important to establish a meaningful and intuitive correlation between the information displayed visually and the manual information perceived as "feel" through the force feedback interface device. This is particularly important when trying to create a simulation environment for allowing users to engage in computer-simulated "sporting" interactions or similar simulations which are receptive to a wide range of physical skill in the user. In such applications, a meaningful and intuitive correlation between the visual display of sporting events and manual physical interactions required of that sporting event is critical.

For example, in a simulated sporting environment, a user might wield an interface device which represents a paddle or racquet within the simulated environment. The user will manipulate the simulated paddle and interact with other simulated entities such as pucks, balls, walls; barriers, and even additional paddles manipulated by other players/users of the environment. The interaction between the user's paddle and other simulated entities in the environment will be displayed visually as well as physically. When the user moves the simulated paddle, the user's kinesthetic sensation of paddle location must be reasonably correlated to the representation of paddle location as displayed visually. If the user perceives kinesthetically that his hand has moved to a given location but views a non-corresponding change in visual location, the realism will suffer and the user will be unable to take advantage of his or her full dexterous skills. In some cases, an unnatural correlation between visual and physical experiences will make it impossible for the user to execute the simulated sporting task.

When there are force feedback sensations provided to the user, this correlation between visual and physical becomes even more important. If the user moves a paddle and feels the sensation of the paddle hitting a simulated puck at a given location, but views the paddle-puck interaction at a different location, the realism will suffer and the user will be unable to take advantage of his/her full dexterous skills. Thus while force feedback is intended to increase the realism of a computer simulated environment and enable dexterous manual activities, if done incorrectly, force feedback can disrupt, confuse, and even inhibit a users ability to take advantage of his or her natural dexterous skills.

What is needed therefore is a computer system providing both visual display and force feedback interfacing mechanisms that can establish a natural and meaningful correlation between information displayed visually and physical interactions perceived manually. Unfortunately, there are limitations to force feedback interface devices which make it difficult to represent many simulated physical interactions. For example, a force feedback device has cost, size, and safety constraints which limit the maximum force output that can be applied to a user and therefore make it infeasible to generate sensations corresponding to general interactions between rigid surfaces. Thus, a user may encounter a simulated hard surface, but the user will be able to easily overpower the resistance because of such force output magnitude limitations. However, it is very easy to visually display a depiction of interactions between rigid surfaces which represents a rigid and impenetrable barrier. This dichotomy between the limitations of visual display and physical display must be resolved, especially in simulated sporting interactions where physical skill is central to the simulation. Therefore, there is needed methods for allowing visual display of simulated interactions and physical display of simulated interactions to deviate from their natural mapping at instances when the force feedback device is simply incapable of representing physical interactions which can be represented visually. Such methods must be developed so as not to greatly disrupt a users ability to use his/her natural manual dexterity.

SUMMARY OF THE INVENTION

The present invention is directed to controlling and providing force feedback to a user operating a human/computer interface device in conjunction with a simulated environment implemented by a host computer system. The user views graphical images on a display while feeling realistic force sensations using safe, practical force feedback devices such that the user is involved in an immersive and intuitive simulation.

More specifically, the present invention provides a method and apparatus for providing a computer-simulated environment visually displaying simulated representations and providing force feedback sensations to a user who controls one or more of the simulated representations using a force feedback interface device. In a preferred embodiment, the simulation is of a sporting environment in which one or more users can compete in physically challenging manual tasks which require dexterity and skill. To provide a realistic sporting environment and to enable the user to provide dexterous control of the simulation, the visually displayed representations are naturally correlated with the manual motions and force feedback experienced by the user. Thus, the manual motions of the user (input) and force feedback (output) are naturally correlated to interactions of user-controlled simulated objects with other displayed simulated objects.

According to one embodiment of the method of the invention, the position of a simulated object generated within a computer simulation is controlled by a user according to a position control mapping. Such a mapping indicates that a change in position of a physical object grasped and moved by the user is directly mapped to a corresponding change in position of the displayed user-controlled simulated object in the simulation. A game apparatus of the present invention allows a position control mapping to be implemented. One embodiment provides a console having two opposing display screens which two players can operate to compete in a sporting simulation. Other embodiments of the game apparatus include a single display screen tabletop, overhead projector displays, and displays projected from beneath a table surface. The interface device of the game apparatus includes a handle for the user to grasp and move in the two degrees of freedom of a plane. Another embodiment conceals a player's hands from the player's view to allow a more immersive experience.

In yet another embodiment, a racquet interface device having a racquet handle moveable in two or more degrees of freedom and a sensor stage allows a player to interact with a sporting simulation.

An embodiment of the present invention for a sporting simulation includes a paddle simulated object controlled by a player and a ball or puck which interacts with the paddle. The player can skillfully move the paddle to interact with the ball and feel forces on the paddle as if the ball and paddle have mass and other physical characteristics. The paddle is preferably compliant and can be used as a "sling" which can catch the ball and be used to direct the ball in a desired direction influenced by the player's skill. One embodiment allows the player to "trap" the ball when it is engaged with the paddle by the use of an input device such as a button. Obstruction objects such as walls can also be included in the simulation and displayed to interact with the ball and the paddle.

The present invention also provides a method and apparatus for providing realistic force feedback sensations in a simulation despite limitations to force feedback devices. More specifically, the mapping between the position of the user-controlled simulated object and the position of the physical user object is broken under specific circumstances to provide a realistic force interaction when forces output to the user are limited in magnitude due to safety, cost, and size concerns. Thus, for example, when the user-controlled simulated object collides with another simulated object, such as a wall, the simulated object is visually blocked; however, the physical user object may still be moved "into" the wall. This breaking of the mapping is associated with force feedback that is effective to impart a physical sensation corresponding to the interaction of the simulated objects.

In one embodiment, the force feedback corresponds to a restoring force that is proportional to the magnitude of the breaking of the simulation. A more specific embodiment incorporates a spring force of the form $F=kx$ as the restoring force, where F is said restoring force, x is the magnitude of the displacement of the graphic object in the absence of the simulated interaction, and k is a spring constant parameter. Another embodiment incorporates both spring and damping forces.

In another embodiment, the second simulated object is controlled by a second user. Variants of this embodiment include those for which the restoring force is a spring force of the form $F=k(x_1+x_2)$, where F is the restoring force, $x_1$ and $x_2$ are the magnitudes of the displacements of in the absence of the simulated interaction, and k is a spring constant parameter. Another embodiment incorporates both spring and damping forces. In another variant, the restoring force includes a weighting factor to allow variation in the paddles of users in the ability to block or push other player's paddles.

In yet other embodiments, multiple players can interact in a simulation such that several paddles and/or balls are provided and influence forces on other users if the paddles interact. The multiple users can interact in a simulation implemented by a single computer system, or in a simulation implemented by multiple computer systems that are linked over a network.

The simulated environment of the present invention allows a player to realistically and skillfully interact with a computer-generated simulation. The position control paddle-ball simulations allow a player to exercise a great degree of skill and dexterity when competing against a computer opponent or other users in a sporting simulation, thus providing a highly entertaining and enjoyable activity. The multi-player sporting simulations allow several players to interactively compete at the local or remote computer sites, thereby providing multiple human components to the competition. The breaking of the position control mapping and provision of restoring forces allows a user to feel realistic collision and interaction forces despite using a force feedback device having force magnitude limitations due to safety, cost, and weight constraints. The interface devices of the present invention, allowing natural motions of the user manipulating the interface device, are ideally suited to allow the user to skillfully interact in sporting simulations.

These and other advantages of the present invention will become apparent to those skilled in the art upon a reading of the following specification of the invention and a study of the several figures of the drawing.

BRIEF DESCRIPTION OF THE DRAWINGS

FIGS. 7a-c illustrate the use of an interface device to move a user-controlled simulated object into an obstruction object according to the present invention;

FIGS. 8a-c illustrate the interaction of two user-controlled simulated objects according to the present invention;

FIGS. 9a-b illustrate the interaction of multiple user-controlled simulated objects according to the present invention;

DETAILED DESCRIPTION OF PREFERRED EMBODIMENTS

Figure 1:
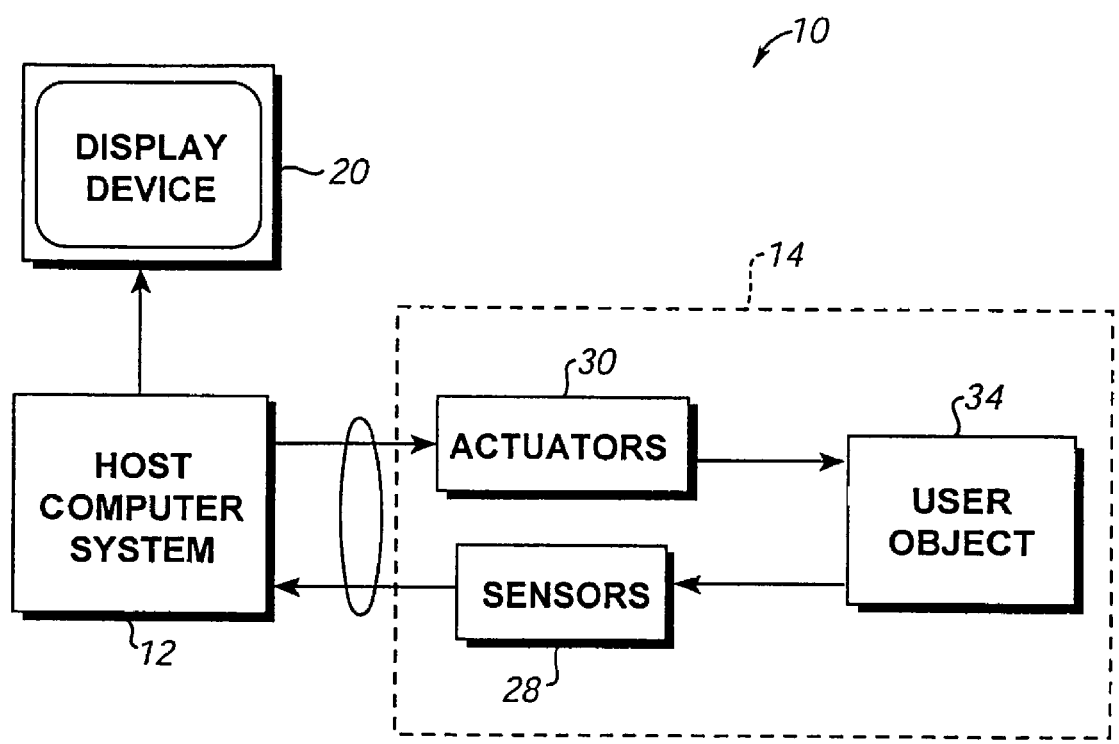
FIG. 1 is a block diagram of a control system for controlling a force feedback interface device using a host computer.

FIG. 1 illustrates a block diagram of a first embodiment of a control system 10 having a host-controlled control loop in the system to generate force sensations to the user through direct computer control, and which is suitable for use in the present invention. An interface device 14 is used by the user to interface with a host computer 12 which implements a simulation, game, or other application program, as described in greater detail below. Host computer 12 has a display device 20 which displays simulated objects in the simulation controlled by the host computer. The host computer, interface device, and display device are described in greater detail with respect to FIG. 2.

A "sporting simulation" or "sporting environment" is often referred to herein. These terms are intended to refer to a game, simulation, or similar interaction of a user with a computer which allows the user to use physical skill in the interactions. More specifically, these terms can refer to interactive simulations that emulate a sporting activity involving physical manipulations in one or more spatial dimensions, such as tennis, badminton, racketball, hockey, ping pong, baseball, golf, boxing, basketball, football, soccer, weight lifting, track and field, billiards, and other sports. These terms can also refer to other physical activities which can be simulated, such as using weapons (sword, mace, staff, spear, etc.) in a hand-to-hand combat or other activities. Since forces are conveyed to the user in the simulations described in the present invention, sporting environments are particularly appropriate for these simulations which require physical manipulations and allow a user to skillfully influence an activity through coarse and subtle experiences of forces.

A user-manipulated object ("user object" or "physical object" herein) 34, such as a joystick or other physical object, is moved by a user to interface with host computer 12. User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user can manipulate and move the object along provided degrees of freedom to interface with the simulation or application program implemented by the host computer. User object 34 can be a joystick, racquet, baseball bat, golf club, hockey stick or handle, mouse, trackball, stylus, sword hilt, steering wheel, medical instrument (laparoscope, catheter, etc.), pool cue, hand grip, knob, button, or other article. A user object 34 and interface device 14 for simulating a racquet in a sporting simulation is described in greater detail with respect to FIG. 19.

User object 34 is preferably coupled to sensors 28 and actuators 30 by a mechanical apparatus which provides a number of degrees of freedom to the user object. Such a mechanical apparatus can take a variety of forms, from a simple rotary joint or linear coupling allowing a single degree of freedom, to a complex mechanical linkage allowing multiple degrees of freedom to the user object. Examples of mechanical apparatuses are described in U.S. Pat. Nos. 5,576,727; 5,731,804, 5,767,839; 5,721,566; and 5,805,140 all of which are hereby incorporated by reference herein. Preferred embodiments of mechanical apparatuses suitable for sporting simulations disclosed herein are described subsequently with reference to FIGS. 14-18.

The user provides input (or "user commands") to the sensors by moving the user object 34 in desired degrees of freedom (and/or activating other input devices, such as a button) and this input is provided to the host computer (or microprocessor 26) to indicate how the user is manipulating the user object and affecting the application program. Sensors 28 detect the position of the user object in one or more provided degrees of freedom and may also include buttons or other controls that detect user actions such as the press of a button, switch, etc. The sensor data including positional data, button data, and/or other data is sent to host computer 12 over a communication bus 24 that is connected to computer 12 with an interface such as an interface card coupled to the main data bus of the host computer, through a serial interface, or through other communication means. To complete the control loop, host computer 12 sends force commands over bus 24 to actuators 30, which output forces on the user object 34 and thus to the user. The functions of reading sensor data and outputting force commands to actuators 30, as well as examples of sensors 28 and actuators 30, are described below with reference to FIG. 2. The embodiment of FIG. 1 can also include other applicable components described in detail with respect to FIG. 2.

Figure 2:
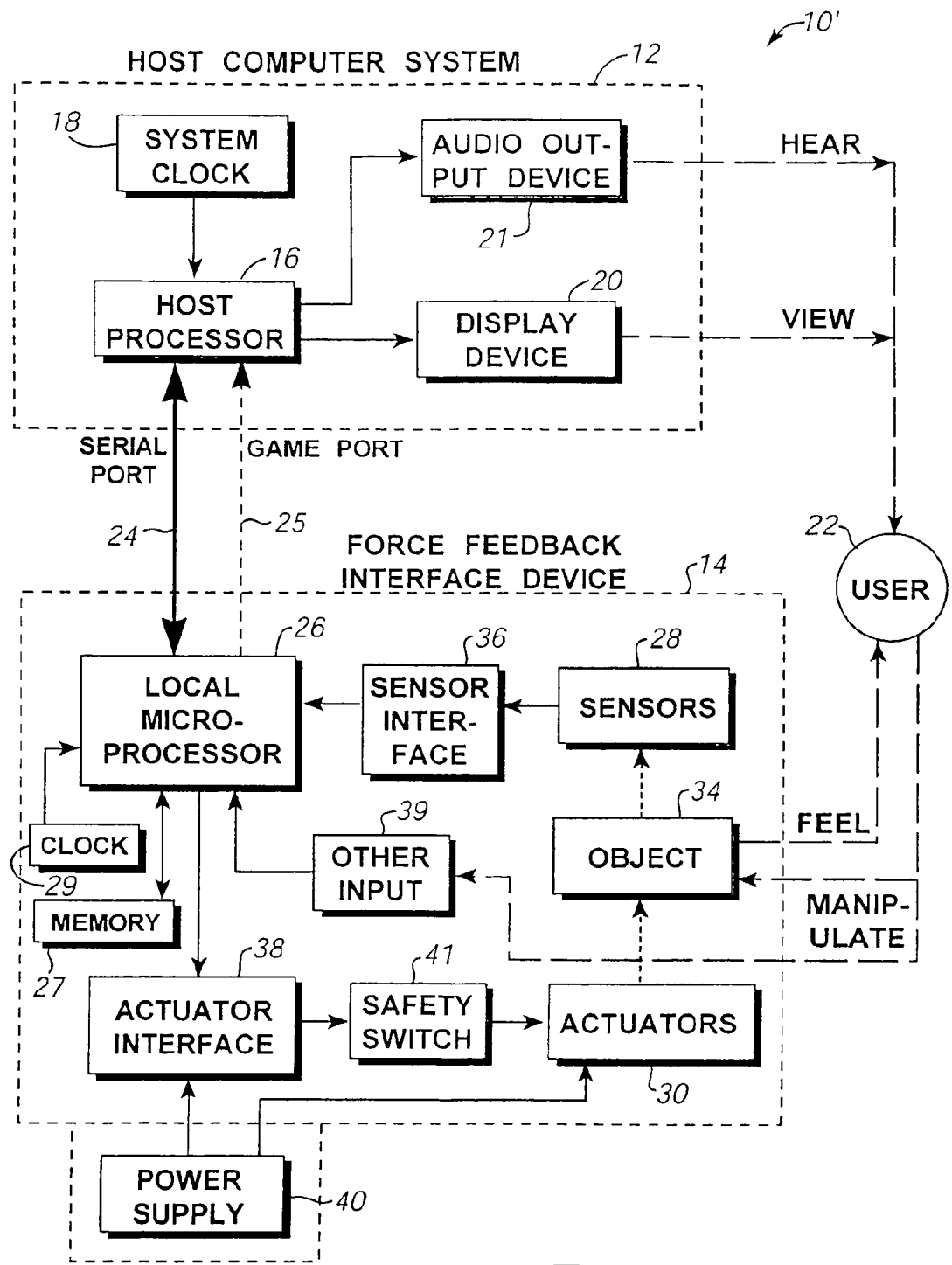
FIG. 2 is a block diagram of a control system for controlling a force feedback interface device using a host computer and local microprocessor.

FIG. 2 is a block diagram illustrating a second embodiment 10' of control system 10 for an interface device controlled by a host computer system and which is suitable for use with the present invention. Control system 10' includes a host computer system 12 and an interface device 14. Host computer system 12 can be a personal computer, such as an IBM-compatible or Macintosh personal computer, a workstation, such as a SUN or Silicon Graphics workstation, or a different type of computer. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a "set top box", "internet computer", application program server, or similar device which can be used, for example, to provide interactive television or information functions to users. The host computer 12 can also be a larger or more powerful computer system that can be used, for example, in a sports facility or other publicly-accessible establishment for simulated sporting events and other events.

In the described embodiment, host computer system 12 implements a host application program with which a user 22 is interacting via peripherals and interface device 14. For example, the host application program can be a video game, medical simulation, scientific analysis program, or even an operating system or other application program that can utilize force feedback. Typically, the host application provides images to be displayed on a display output device, as described below, and/or other feedback, such as auditory signals. For example, a graphical user interface for an operating system is described in greater detail in U.S. Pat. No. 6,219,032, which is hereby incorporated by reference herein.

Host computer system 12 can include a host microprocessor 16, random access memory (RAM) 17, read-only memory (ROM) 19, input/output (I/O) electronics 21, a clock 18, a display device 20, and an audio output device 21, as well as other components well-known to those skilled in the art. Host microprocessor 16 can include a variety of available microprocessors from Intel, Motorola, or other manufacturers. Microprocessor 16 can be single microprocessor chip, or can include multiple primary and/or co-processors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device 14 and other information. Microprocessor 16 can receive or transmit data on bus 24 using I/O electronics 21, and can use I/O electronics to control other peripheral devices. Host computer system 12 can also output a "force command" to interface device 14 via bus 24 to cause force feedback to the user via the interface device.

Clock 18 is a standard clock crystal or equivalent component used by host computer system 12 to provide timing to electrical signals used by microprocessor 16 and other components of the computer system. Clock 18 can be accessed by host computer system 12 in the control process of the present invention, as described subsequently.

Display device 20 is coupled to host microprocessor 16 by suitable display drivers and can be used to display images generated by host computer system 12 or other connected computer systems. Display device 20 can be a standard display screen, CRT, back- or front-projection screen, 3-D goggles, a computer controlled laser, or any other visual interface. In a described embodiment, display device 20 displays images of a simulation (such as a sporting simulation) or game environment. In other embodiments, other images can be displayed. For example, images describing a point of view from a first-person perspective can be displayed, as in a virtual reality simulation or game. Or, images describing a third-person (e.g., overhead or side view) perspective of objects, backgrounds, etc. can be displayed. A user 22 of the host computer 12 and interface device 14 can receive visual feedback by viewing display device 20.

Herein, computer 12 may be referred as generating and displaying computer "objects" or "entities." These computer objects are not physical objects, but is a logical software unit or collection of data and/or procedures that may be displayed as images by computer 12 on display device 20, as is well known to those skilled in the art. For example, a paddle, cursor, or a third-person view of a car might be considered player-controlled simulated objects that can be moved across the screen. A displayed, simulated cockpit of an aircraft might also be considered an "object". The simulated aircraft, or other objects, can also be considered computer controlled "entities."

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), communication devices (network interfaces, modems, wireless transmitter/receivers, etc.), printers, scanners, and other input and output devices.

An interface device 14 is coupled to host computer system 12 by an interface bus 24. The interface bus sends signals in one or both directions between host computer system 12 and the interface device. Herein, the term "bus" is intended to generically refer to any interface, connection, or communication link such as between host computer 12 and a peripheral such as interface device 14 which typically includes one or more connecting wires, lines, cables, or other connections and that can be implemented in a variety of ways. In one embodiment, bus 24 is a serial interface bus providing data according to a serial communication protocol. An interface port of host computer system 12, such as an RS232 serial interface port, can connect bus 24 to host computer system 12. Other standard serial communication protocols can also be used in the serial interface and bus 24, such as RS-422, Universal Serial Bus (USB), MIDI, system-specific ports on a Sega, Sony, etc. game system, or other protocols/standards well known to those skilled in the art.

An advantage of the present embodiment is that low-bandwidth serial communication signals can be used to interface with interface device 14, thus allowing a user to directly use a standard built-in serial interface of many low-cost computers. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in card and slot or other access of computer system 12. For example, on an IBM AT compatible computer, the interface card can be implemented as an ISA, EISA, VESA local bus, PCI, or other well-known standard interface card. Other types of interfaces 14 can be used with other computer systems. In another embodiment, an additional bus 25 can be included to communicate between host computer system 12 and interface device 14. Since the speed requirement for communication signals is relatively high for outputting force feedback signals, a single serial interface used with bus 24 may not provide signals to and from the interface device at a high enough rate to achieve realistic force feedback. Bus 24 can thus be coupled to the standard serial port of host computer 12, while an additional bus 25 can be coupled to a second port of the host computer system, such as a "game port" or other port. The two buses 24 and 25 can be used simultaneously to provide an increased data bandwidth. Such an embodiment is described in greater detail in U.S. Pat. No. 5,691,898, which is hereby incorporated by reference herein.

The described embodiment of interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered "local" to interface device 14, where "local" herein refers to processor 26 being a separate microprocessor from any microprocessors in host computer system 12. "Local" also preferably refers to microprocessor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode and/or parse the commands or requests, manipulate data and select routines, and handle/control input and output signals according to the commands or requests. In addition, processor 26 preferably operates independently of host computer 16 by reading sensor signals and calculating appropriate forces from those sensor signals, time signals, and a "force routine" selected in accordance with a host command. Suitable microprocessors for use as local microprocessor 26 include the MC68HC711E9 by Motorola and the PIC16C74 by Microchip, for example. Microprocessor 26 can include one microprocessor chip, or multiple processors and/or co-processor chips. In other embodiments, microprocessor 26 can include a digital signal processor (DSP) chip. Local memory 27, such as RAM and/or ROM, is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from a clock signal in the USB data stream or from other USB modes and clocks.

For example, in one embodiment, host computer 12 can provide low-level force commands over bus 24, which microprocessor 26 directly provides to actuators 30. This embodiment is described in greater detail with respect to FIG. 3. In a different embodiment, host computer system 12 can provide high level supervisory commands to microprocessor 26 over bus 24, and microprocessor 26 manages low level force control ("reflex") loops to sensors 28 and actuators 30 in accordance with the high level commands. This embodiment is described in greater detail with respect to FIG. 4.

Microprocessor 26 preferably also has access to an electrically erasable programmable ROM (EEPROM) or other memory storage device 27 for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The implementation of calibration parameters is well-known to those skilled in the art.

Microprocessor 26 can also receive commands from any other input devices included on interface apparatus 14 and provides appropriate signals to host computer 12 to indicate that the input information has been received and any information included in the input information. For example, buttons, switches, dials, or other input controls on interface device 14 or user object 34 can provide signals to microprocessor 26.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30.

Sensors 28 sense the position, motion, and/or other characteristics of a user object 34 of the interface device 14 along one or more degrees of freedom and provide signals to microprocessor 26 including information representative of those characteristics. An example of an embodiment of a user object and movement within provided degrees of freedom is described subsequently with respect to FIG. 14. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the change in position of object 34 along a linear degree of freedom, and can produces the two phase-related signals in response to movement of a linear shaft in the linear degree of freedom. Either relative or absolute sensors can be used. For example, relative sensors only provide relative angle information, and thus usually require some form of calibration step which provide a reference position for the relative angle information. When using relative sensors, there is an implied calibration step after system power-up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in co-pending patent application Ser. No. 08/461,170 describes a sensor interface including a separate processing chip dedicated to each sensor that provides input data. Alternatively, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor such as a potentiometer can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC.

Other types of interface circuitry 36 can also be used. For example, an electronic interface is described in U.S. Pat. No. 5,576,727, assigned to the same assignee as the present application, and which is hereby incorporated by reference herein. The interface allows the position of the mouse or stylus to be tracked and provides force feedback to the stylus using sensors and actuators. Sensor interface 36 can include angle determining chips to pre-process angle signals reads from sensors 28 before sending them to the microprocessor 26. For example, a data bus plus chip-enable lines allow any of the angle determining chips to communicate with the microprocessor. A configuration without angle-determining chips is most applicable in an embodiment having absolute sensors, which have output signals directly indicating the angles without any further processing, thereby requiring less computation for the microprocessor 26 and thus little if any preprocessing. If the sensors 28 are relative sensors, which indicate only the change in an angle and which require further processing for complete determination of the angle, then angle-determining chips are more appropriate.

Actuators 30 transmit forces to user object 34 of the interface device 14 in one or more directions along one or more degrees of freedom in response to signals received from microprocessor 26 (or host computer 12 in some embodiments). Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, voice coils, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil actuator, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight generated forces. Passive actuators typically can only provide bi-directional resistance to a degree of motion. A suitable magnetic particle brake for interface device 14 is available from Force Limited, Inc. of Santa Monica, Calif.

In alternate embodiments, all or some of sensors 28 and actuators 30 can be included together as a sensor/actuator pair transducer. A suitable transducer for the present invention including both an optical encoder and current controlled motor is a 20 W basket wound servo motor manufactured by Maxon.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord. Alternatively, if the USB or a similar communication protocol is used, interface device 14 can draw power from the bus 24 and thus have no need for power supply 40. Such an embodiment is described in greater detail in U.S. Pat. No. 5,691,898.

Safety switch 41 can be included in interface device 14 to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In one embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is deactivated. Examples of safety switches are described in U.S. Pat. No. 5,691,898.

User object 34 is preferably a device or article that may be grasped or otherwise contacted or controlled by a user and which is coupled to interface device 14, as described with reference to FIG. 1. The user 22 can manipulate and move the object along provided degrees of freedom to interface with the host application program the user is viewing on display device 20. A mechanical apparatus which provides a number of degrees of freedom to the user object can also couple the user object to the sensors and actuators, as described above.

Figure 3:
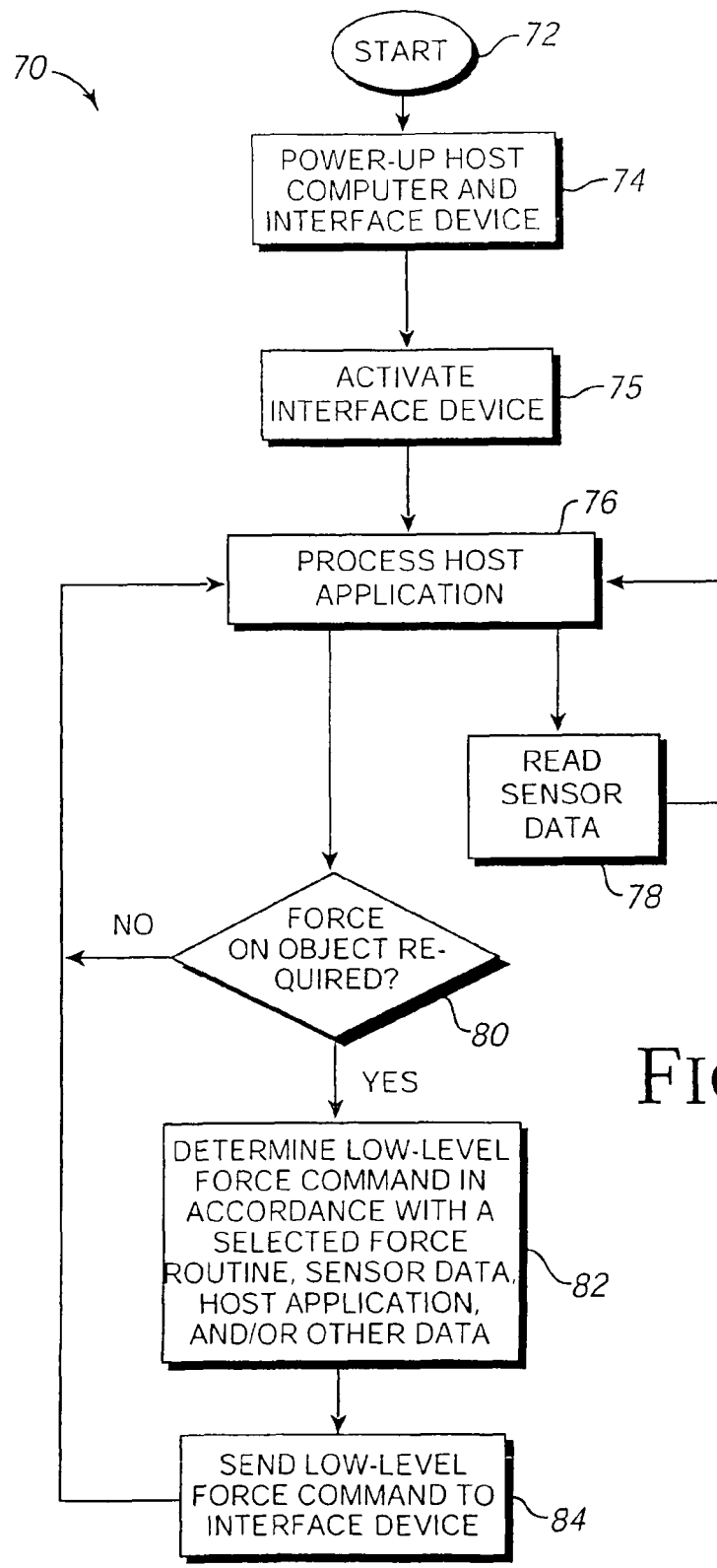
FIG. 3 is a flow diagram illustrating a first embodiment of a method of the present invention for controlling a force feedback interface device.

FIG. 3 is a flow diagram illustrating a first embodiment of a method 70 for controlling a force feedback interface device for use with the present invention. Method 70 is directed to a "host-controlled" embodiment, in which host computer system 12 provides force commands directly to actuators 30 (and/or actuator interface 38) to control forces output by the actuators.

The process begins at 72. In step 74, host computer system 12 and interface device 14 are powered up, for example, by a user activating power switches. In step 75, the interface device 14 is activated. For example, signals can be sent between host computer 12 and interface device 14 to acknowledge that the interface device is now active and ready to receive commands.

In next step 76, an application program is processed and/or updated. This application is preferably a sporting simulation of the present invention, but can also be a video game, scientific program, or other program. Images can be displayed for a user on output display device 20 and other feedback can be presented, such as audio feedback.

Two branches exit step 76 to indicate that there are two processes running simultaneously (e.g., multitasking or using multiple processors) on host computer system 12. In one process, step 78 is implemented, where sensor data is received by the host computer from the interface device 14. The host computer 12 continually receives signals from sensors 28, processes the raw data, and utilizes processed sensor data in the application program. "Sensor data", as referred to herein, can include position values, velocity values, and/or acceleration values derived from the sensors 28 which detect motion of object 34 in one or more degrees of freedom. In addition, any other data received from other input devices 39 can also be received by host computer system 12 as sensor data in step 78, such as signals indicating a button on interface device 14 has been activated by the user. Finally, the term "sensor data" also can include a history of values, such as position values recorded previously and stored in order to calculate a velocity.

After sensor data is read in step 78, the process returns to step 76, where the host computer system 12 can update the application program in response to the user's manipulations of object 34 and any other user input received in step 78 as well as determine if forces need to be applied to object 34 in the parallel process. Step 78 is implemented in a continual loop of reading data from sensors 28.

The second branch from step 76 is concerned with the process of the host computer determining force commands to provide force feedback to the user manipulated object 34. These commands are described herein as "low-level" force commands, as distinguished from the "high-level" or supervisory force commands described in the embodiment of FIG. 4. A low level force command instructs an actuator to output a force of a particular magnitude. For example, the low level command typically includes a magnitude force value, e.g., equivalent signal(s) to instruct the actuator to apply a force of a desired magnitude value. Low level force commands may also designate a direction of force if an actuator can apply force in a selected direction, and/or other low-level information as required by an actuator.

The second branch starts with step 80, in which the host computer system checks if a force should be applied to user object 34. This can be determined by several types of criteria, the most important of which are the sensor data read by the host computer in step 78, timing data, and the implementation or "events" of the application program updated in step 76. The sensor data read in step 78 informs the host computer 12 how the user is interacting with the application program. From the position of object 34 sensed over time, the host computer system 12 can determine when forces should be applied to the object. For example, if the host computer is implementing a sporting simulation application, the position of a computer-generated simulated object within the game may determine if force feedback is called for. If the user is controlling a simulated race car, the position of the user object joystick determines if the race car is moving into a wall and thus if a collision force should be generated on the joystick. In addition, the velocity and/or acceleration of the user object can influence whether a force on the object is required. If the user is controlling a tennis racket in a game, the velocity of a user object joystick in a particular degree of freedom may determine if a tennis ball is hit and this if an appropriate force should be applied to the joystick. Also, other input, such as a user activating buttons or other controls on interface device 14, can change the forces required on object 34 depending on how those controls have been programmed to affect the application program.

Other criteria for determining if a force is required includes events in the application program. For example, a game application program may (perhaps randomly) determine that another object in the game is going to collide with a simulated object controlled by the user, regardless of the position of the user object 34. Forces should thus be applied to the user object dependent on this collision event to simulate an impact. Forces can be required on the user object depending on a combination of such an event and the sensor data read in step 78. Other parameters in the application program can determine if a force to the user object is necessary, such as other input devices or user interface devices connected to host computer system 12 and inputting data to the application program (other interface devices can be directly connected, connected remotely through a network, etc.).

In step 80, if no force is currently required to be output, then the process returns to step 76 to update the host application and return to, step 80 to again check until such force is required. When a force is required, step 82 is implemented, in which host computer 12 determines appropriate low-level force commands to be sent to the actuators 30 of interface device 14, these force commands being dependent on a selected force routine, sensor data, the host application, and the clock 18.

The low-level force commands can be determined, in part, from a selected force routine. A "force routine", as referred to herein, is a set of steps or instructions for providing low-level force commands to actuators 30. Force routines determine low level force commands from other parameters, such as sensor data read in step 218 (button press data, position data, etc.) and timing data from clock 18. The force routines can be stored local to microprocessor 26 in, for example, memory 27 such as RAM or ROM (or EPROM, EEPROM, etc.). Thus, the microprocessor might select a particular damping force routine if the host command indicated that the damping force from that particular damping process should be applied to object 34. Other damping force routines might also be available. Force routines may include algorithms, stored force profiles, force values, conditions, or other instructions.

One type of instruction is a force algorithm, which includes an equation or relationship that host computer 12 can use to calculate or model a force value based on sensor and timing data. Several types of algorithms can be used. For example, algorithms in which force varies linearly (or nonlinearly) with the position of object 34 can be used to provide a simulated force like a spring. Algorithms in which force varies linearly (or nonlinearly) with the velocity of object 34 can be also used to provide a simulated damping force or other forces. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, April 1993, which is incorporated by reference herein.

For force values depending on the velocity and acceleration of user object 34, the velocity and acceleration can be provided in a number of different ways. The sensor data read by host computer 12 in step 78 can include position data, velocity data, and acceleration data. In one embodiment, the velocity and acceleration data can be directly sensed by velocity sensors and acceleration sensors. The host computer can thus use the velocity and acceleration data directly in an algorithm to calculate a force value. In another embodiment, the sensor data read in step 78 includes position data and no velocity or acceleration data, so that host computer 12 is required to calculate the velocity and acceleration from the position data when necessary. This can be accomplished by recording a number of past position values, recording the time when each such position value was received using the system clock 18, and calculating a velocity and/or acceleration from such data.

For example, a kinematic equation which calculates a force based on the velocity of the user object multiplied by a damping constant can be used to determine a damping force on the user object. This type of equation can simulate motion of object 34 along one degree of freedom through a fluid or similar material. A procedure for calculating a damping force on object 34 is described in U.S. Pat. No. 5,767,839, which is hereby incorporated by reference herein. For example, a damping constant can first be selected which indicates the degree of resistance that object 34 experiences when moving through a simulated material, such as a liquid, where a greater number indicates greater resistance. For example, water would have a lower damping constant than oil or syrup. The host computer recalls the previous position of user object 34 (along a particular degree of freedom), examine the current position of the user object, and calculate the difference in position. From the sign (negative or positive) of the difference, the direction of the movement of object 34 can also be determined. The force is then set equal to the damping constant multiplied by the change in position. Commands that controlled an actuator based on this algorithm would produce a force proportional to the user object's motion to simulate movement through a fluid. Movement in other mediums, such as on a bumpy surface, on an inclined plane, etc., can be simulated in a similar fashion using different methods of calculating the force.

The determination of force commands is preferably influenced by timing data accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multitasking. Therefore, the host computer can access clock 12 to determine how much time has actually elapsed since the last position data was received. In the damping force example, the host computer could take the difference in position and divide it by a time measure to account for differences in timing. The host computer can thus use the clock's timing data in the modulation of forces and force sensations to the user. Timing data can be used in other algorithms and force sensation processes of the present invention to provide repeatable and consistent force feedback regardless of type of platform or available processing time on host computer 12.

Other instructions can also be included in a force routine. For example, conditions can be included to provide forces only in desired directions or under other particular circumstances. For example, to simulate a virtual obstruction such as a wall, forces should be applied in only one direction (unidirectional). For many passive actuators, only bi-directional resistance forces can be applied. To simulate uni-direction resistance, conditions can be included in the virtual obstruction force routine. One example of implementing obstruction forces is described with reference to FIGS. 7 and 8. Also, a "null" reflex process can be available that instructs host computer 12 (or microprocessor 26 in the embodiment of FIG. 4) to issue a low level command or force values to provide zero forces (i.e., remove all forces) on user object 34.

Force routines can also use force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by a force sensation process to retrieve successive force values from a certain storage device, such as RAM, ROM, hard disk, etc. These force values can be sent directly to an actuator to provide particular forces without requiring host computer 12 to calculate the force values. In addition, previously-stored force values can be output with respect to other parameters to provide different types of forces and force sensations from one set of stored force values. For example, using system clock 18, the stored force values can be output in sequence according to a particular time interval that can vary depending on the desired force. Or, different retrieved force values can be output depending on the current position of user object 34.

Host computer 12 can determine a force command in step 82 according to a newly-selected force routine, or to a previously selected force routine. For example, if this is a second or later iteration of step 82, the same force routine as in the previous iteration can be again implemented if parameters (such as the position of object 34) allow it, as determined by the host application program.

The force command determined in step 82 can also depend on instructions that check for other parameters. These instructions can be included within or external to the above-described force routines. One such parameter are values provided by the implemented host application program. The application program may determine that a particular force command should be output or force routine implemented based on events occurring within the application program or other instructions. Force commands or values can be provided by the host application program independently of sensor data. Also, the host application program can provide its own particular position, velocity, and/or acceleration data to a selected force routine to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34. For example, the sensor data from multiple interface devices 14 connected to a single host computer can influence the forces felt on other connected interface devices by influencing events and computer-controlled images/objects of the host application program.

Also, the force commands determined in step 82 can be based on other inputs to host computer 12, such as activations of buttons or other input devices in (or external to) interface device 14. For example, a particular application program might require that a force be applied to a joystick whenever a user presses a fire button on the joystick.

The above-described force routines and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other uni-directional forces in a simulation, game, etc. When a user moves a computer image into a virtual obstruction with a joystick, the user then feels a physical resistance as he or she continues to move the joystick in that direction. If the user moves the object away from the obstruction, the uni-directional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, as according to a reflex process. This frequency is based upon the travel of the joystick handle and is thus correlated with spatial position. Thus, the user feels a physical sensation of texture, which can be described as the feeling of dragging a stick over a grating.

In next step 84, a low-level force command determined in step 82 is output to interface device 14. This force command typically includes a force magnitude, direction, and/or actuator designation that was determined in accordance with the parameters described above. The force command can be output as an actual force signal that is relayed to one or more appropriate actuators 30 or to actuator interface 38. The process then returns to step 76 to process/update the host application program. The process continues to step 80, where the host computer 12 checks if a different force command should be output as determined by the parameters described above. If so, a new force command is determined and output in step 84.

In addition, the host computer 12 preferably synchronizes any appropriate visual feedback, auditory feedback, and/or other feedback related to the host application with the application of forces on user object 34. For example, in a video game application, the onset or start of visual events, such as an object colliding with the user-controlled object on display device 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. Preferably, the magnitude of the sound is in direct (as opposed to inverse) proportion to the magnitude of the forces applied to user object 34. For example, during a simulation, a low sound of an explosion in the far (virtual) distance can cause a small force on user object 34, while a large, "nearby" explosion might cause a loud sound to be output by the speakers and a correspondingly large force to be output on object 34.

In an alternate embodiment having host computer 12 directly control force feedback, a local microprocessor 26 (as shown in FIG. 2) can be included in interface device 14 to assist in relaying sensor and actuator data to and from the host and for commanding forces to be output as long as there is no change in forces. This type of embodiment is not a "reflex" embodiment as described in FIG. 4 since forces output by interface device 14 are dependent on active and continuous control from the host computer. Such an embodiment is described in greater detail in U.S. Pat. Nos. 5,739,811 and 5,734,373, both incorporated by reference herein. For example, in step 80 above, the host computer can check if there is a change in force required on user object 34 depending on the above-described parameters. If not, then the host need not issue a low-level command, since local microprocessor could continue to issue the previous low-level command. The local microprocessor 26 can also convert a low-level command to an appropriate form before it is sent to actuators 30.

In such an embodiment, the microprocessor 26 can read raw data (sensor readings) from sensors 28, such as position values describing the position of the user object along provided degrees of freedom, raw velocity and acceleration values from velocity/acceleration sensors, and other input such as from an activated button or other control 39 of interface device 14. Processor 26 processes the raw data into sensor data, which can include computing velocity and/or acceleration values from raw position data (if appropriate), filtering noise from computed velocity and acceleration data, and storing position and time values (using local clock 29). In an alternate embodiment, hard-wired circuitry can be used to receive the raw data and determine velocity and acceleration. For example, an application-specific integrated circuit (ASIC) or discrete logic circuitry can use counters or the like to determine velocity and acceleration. In parallel with reading/processing sensor data, the microprocessor can controlling the actuators 30 in accordance with low-level commands from host computer 12. The microprocessor can continually check for receiving a low-level force command; when such occurs, the command is relayed to the designated actuators to set the output force to the desired magnitude, direction, etc. This force command may be directly output to actuators (or actuator interface) from the host computer, or, processor 26 can optionally convert the force command to an appropriate form usable by actuator 30 (or actuator interface 38 can perform such conversion).

Figure 4:
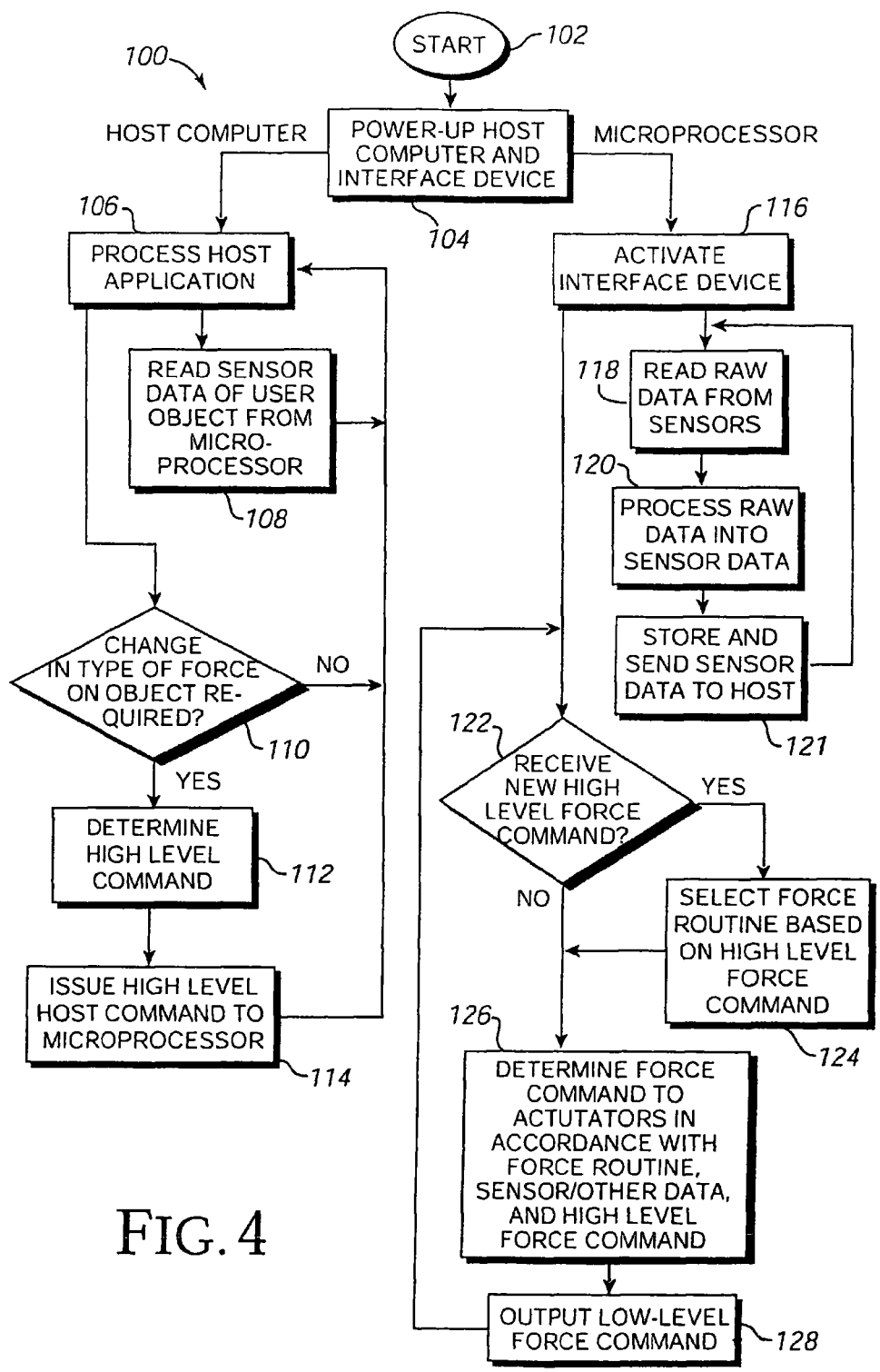
FIG. 4 is a flow diagram illustrating a second embodiment of a method of the present invention for controlling a force feedback interface device.

FIG. 4 is a flow diagram illustrating a second embodiment of a method 100 for controlling a force feedback interface device. Method 100 is directed to a "reflex" embodiment, in which host computer system 12 provides high-level supervisory force commands ("host commands") to microprocessor 26 of interface device 14, while the microprocessor independently determines and provides low-level force commands (force values) to actuators 30 as an independent "reflex" to control forces output by the actuators. In other embodiments not including microprocessor 26, method 100 can be used by providing logic or other components to perform the microprocessor steps.

The process of FIG. 4 is suitable for low speed communication interfaces, such as a standard RS-232 serial interface. However, the embodiment of FIG. 4 is also suitable for high speed communication interfaces such as USB, since the local microprocessor relieves computational burden from host processor 16. In addition, this embodiment can provide a straightforward command protocol, an example of which is described with respect to U.S. Pat. No. 5,734,373, incorporated by reference herein, and which allows software developers to easily provide force feedback in a host application.

The process begins at 102. In step 104, host computer system 12 and interface device 14 are powered up, for example, by a user activating power switches. After step 104, the process 100 branches into two parallel processes. One process is implemented on host computer system 12, and the other process is implemented on local microprocessor 26. These two processes branch out of step 204 in different directions to indicate this simultaneity.

In the host computer system process, step 106 is first implemented, in which an application program is processed or updated. This application can be a simulation, video game, scientific program, operating system, or other software program. Images can be displayed for a user on output display device 20 and other feedback can be presented, such as audio feedback.

Two branches exit step 106 to indicate that there are two processes running simultaneously (e.g., multi-tasking, etc.) on host computer system 12. In one of the processes, step 108 is implemented, where sensor data from the user object is received by the host computer from local microprocessor 26. Host computer system 12 receives either raw data (e.g., position data and no velocity or acceleration data) or processed sensor data (position, velocity and/or acceleration data) from microprocessor 26. In addition, any other data received from other input devices 39 can also be received by host computer system 12 from microprocessor 26 in step 108, such as signals indicating a button on interface device 14 has been pressed by the user. Unlike the previous embodiment of FIG. 3, the host computer does not calculate force values from the received sensor data in step 108. Rather, host computer 12 monitors the sensor data to determine when a change in the type of force is required. This is described in greater detail below. Of course, host computer 12 also uses the sensor data as input for the host application to update the host application and display accordingly.

After sensor data is received in step 108, the process returns to step 106, where the host computer system 12 can update the application program in response to the user's manipulations of object 34 and any other user input received in step 108 as well as determine if one or more force commands need to be output to object 34 in the parallel process (step 110). Step 108 is implemented in a continual loop of receiving sets of sensor data from local processor 26. Since the host computer does not need to directly control actuators based on sensor data, the sensor data can be provided at a low speed. For example, since the host computer updates the host application and images on display device 20 in response to sensor data, the sensor data need only be read at 60-70 Hz (the refresh cycle of a typical display screen) compared to the much higher rate of about 500-1000 Hz (or greater) needed to realistically provide low-level force feedback signals directly from the host. Host computer 12 also preferably synchronizes visual, audio, and force events similarly as described above with reference to FIG. 3.

The second branch from step 106 is concerned with the process of the host computer determining high-level or supervisory force commands ("host commands") to provide force feedback to the user manipulated object 34. The second branch starts with step 110, in which the host computer system checks if a change in the type of force applied to user object 34 is required. The "type" of force is intended to generically refer to different force sensations, durations, directions, or other high-level characteristics of forces, or changes in these characteristics, which are controlled by the host computer. For example, a force sensation or profile are types of forces produced by a particular force routine which the local microprocessor 26 can implement independently of the host computer.

The host computer 12 determines whether a change in the type of force is required according to several criteria, the most important of which are the sensor data read by the host computer 12 in step 108, timing data, and the implementation or "events" of the application program updated in step 106. As explained with reference to FIG. 3, the sensor data informs the host computer when forces should be applied to the object based on the object's current position, velocity, and/or acceleration. The user's manipulations of object 34 may have caused a new type of force to be required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e., a removal of damping force in this case) is required. The velocity and/or acceleration of the user object can also influence whether a change in force on the object is required, as well as events occurring within the application program. For example, if the user is controlling a tennis racket in a game, the velocity of a user object joystick may determine if a tennis ball is hit and thus if an appropriate force should be applied to the joystick. Also, other input, such as a user activating buttons or other input devices 39 on interface device 14, can change the type of forces required on object 34 (other interface devices can be directly connected, connected remotely through a network, etc.).

If no change in the type of force is currently required in step 110, then the process returns to step 106 to update the host application and return to step 110 to again check until such a change the type of force is required. When such a change is required, step 112 is implemented, in which host computer 12 determines an appropriate host command to send to microprocessor 26. The available host commands for host computer 12 can correspond to an associated force routine implemented by microprocessor 26. For example, different host commands to provide a damping force, a spring force, a gravitational pull, a bumpy surface force, a virtual obstruction force, and other forces can be available to host computer 12. These host commands can also include a designation of the particular actuators 30 and/or degrees of freedom which are to apply this desired force on object 34. The host commands can also include other command parameter information which might vary the force produced by a particular force routine. For example, a damping constant can be included in a host command to designate a desired amount of damping force, or a direction of force can be provided. The host command may also preferably override the reflex operation of the processor 26 and include low-level force commands directly sent to actuators 30. A preferred command protocol and detailed description of a set of host commands is described in U.S. Pat. No. 5,734,373. These commands can include direct host commands, "reflex" commands, and custom effects. Each direct host command preferably includes parameters which help the host specify the characteristics of the desired output force and may include a specified force routine. "Reflex" commands, in contrast, provide conditions to the microprocessor so that the desired force is output when the conditions are met, such as when a specified button is pressed by the user. Custom effects can be provided to the microprocessor 26 by the host and then commanded to be output. For example, the host computer can download to the microprocessor a set of force values (a force profile) as a "force profile file" or other collection of data using a host command LOAD_PROFILE; a separate host command PLAY_PROFILE could then be sent to instruct the microprocessor to output the downloaded force profile as forces on user object 34, or when a condition occurs, etc. For example, a force profile file can include an array of force values, size information about the size of the data, and timing information for when to output the various force values.

In next step 114, the host computer sends the host command to the microprocessor 26 over bus 24. The process then returns to step 106 to update the host application and to return to step 110 to check if another change in force is required.

The second process branching from step 104 is implemented by the local microprocessor 26. The process starts with step 116 and is in parallel with the host computer process of steps 106-114. In step 116, the interface device 14 is activated. For example, signals can be sent between host computer 12 and interface device 14 to acknowledge that the interface device is now active and can be commanded by host computer 12. From step 116, two processes branch to indicate that there are two processes running simultaneously (multitasking) on local processor 26.

In the first process branch, step 118 is implemented, in which the processor 26 reads raw data from sensors 28. Such raw data preferably includes position values describing the position of the user object along provided degrees of freedom. In alternate embodiments, sensors 28 can include velocity sensors and accelerometers for providing velocity and acceleration values of object 34. The raw data read in step 118 can also include other input, such as from an activated button or other control 39 of interface device 14.

In next step 120, microprocessor 26 processes the received raw data into sensor data. As described in step 90 of FIG. 3, this processing can include the steps of computing velocity and acceleration data from the filtered position data and filtering the velocity and acceleration data. Processor 26 can use its own local clock 21 to determine the timing data needed for computing velocity and acceleration. In addition, a history of previous recorded values, such as position or velocity values, can be used to calculate sensor data. In embodiments where velocity and/or acceleration sensors are used, the calculation of velocity and/or acceleration is omitted. In next step 121, the processor 26 sends the processed sensor data to host computer 12 and also stores the data for computing forces, as described in the second branch process of processor 26. The process then returns to step 118 to read raw data. Steps 118, 120 and 121 are thus continuously implemented to provide current sensor data to processor 26 and host computer 12.

The second branch from step 116 is concerned with a "reflex process" or "reflex" in which microprocessor 26 controls the actuators 30 to provide forces to object 34. A "reflex process" is a force process that outputs forces on user object 34 and is implemented locally to interface device 14, is independent of host computer 12, and depends only on local control events, such as buttons being pressed or user object 34 being moved by the user.

The second branch starts with step 122, in which processor 26 checks if a host command has been received from host computer 12 over bus 24. If so, the process continues to step 124, where a force routine associated with the host command is selected if appropriate. Such force routines can be stored local to microprocessor 26 in, for example, memory 27 such as RAM or ROM (or EPROM, EEPROM, etc.). Thus, the microprocessor might select a damping force routine if the high level command indicated that the damping force from this reflex process should be applied to object 34. The available force routines are preferably similar to those described above with reference to FIG. 3, and may include algorithms, stored force profiles or values, conditions, etc. In some embodiments, steps 118, 120, and 121 for reading sensor data can be incorporated in the force routines for the microprocessor, so that sensor data is only read once a force routine has been selected. Also, the host command may in some instances simply be a low-level force command that provides a force value to be sent to an actuator 30 (as in the embodiment of FIG. 4), in which case a force routine need not be selected.

After a force routine has been selected in step 124, or if a new host command has not been received in step 122, then step 126 is implemented, in which processor 26 determines a processor low-level force command. The low-level force command is derived from a selected force routine, a resident force routine, any other data required by the force routine, and/or command parameters and/or values included in relevant host commands. As explained above, the required data can include sensor data and/or timing data from local clock 29. Thus, if no new high level command was received in step 122, then the microprocessor 26 can determine a force command according to one or more "resident" force routines that were previously used in step 126. This use of resident force routines allows the "reflex" operation, independent of the host, to take place. In addition, the host command can include other command parameter information needed to determine a force command, such as an indication of a direction of force along a degree of freedom.

In step 128, processor 26 outputs the determined processor low-level force command to actuators 30 to set the output force to the desired level. Before sending out the low-level force command, processor 26 can optionally convert the force command to an appropriate form usable by actuator 30, and/or actuator interface 38 can perform such conversion. The process then returns to step 122 to check if another host command has been received from the host computer 12.

The reflex process of microprocessor 26 (steps 118, 120, 122, 124, 126, and 128) thus operates to provide forces on object 34 independently of host computer 12 according to a selected force routine and other parameters. The force routine instructs how the processor force command is to be determined based on the most recent sensor data read by microprocessor 26. Since a reflex process independently outputs forces depending on the local control events of interface device 14, the host computer is freed to process the host application and determine only when a new type of force needs to be output. This greatly improves communication rates between host computer 12 and interface device 14.

In addition, the host computer 12 preferably has the ability to override the reflex operation of microprocessor 26 and directly provide low-level commands as described above with reference to FIG. 3. This override mode can also be implemented as a force routine. For example, the microprocessor 26 can select a force routine that instructs it to relay low-level force commands received from host computer 12 to one or more actuators 30.

Another advantage of the reflex embodiment of FIG. 4 is that the low communication needs between the host computer and the interface device allows force feedback to be easily implemented over computer networks. For example, host computer 12 can be connected to the Internet/World Wide Web networks as is well known to those skilled in the art. A "web page" or other network site or node can store force feedback information for a user to download and implement using interface device 14. For example, a web page might store a sequence of force values so that the user can interact with a simulation implemented on the web page. The host computer 12 can receive the force commands or other force information over the network using, for example, a web browser or software utility such as Netscape from Netscape Communications. As the force information is received by the host, the host can transmit the force information to the microprocessor 26 to control the actuators as described above. Since only high level force commands are needed in the reflex embodiment, the web page need store only a small amount of information to be downloaded to the host computer rather than the large amount of low-level force values necessary to control actuators. A high level command protocol allows more realistic force feedback interaction over a global network.

Embodiments using a local microprocessor 26 to implement reflex processes is described in U.S. Pat. Nos. 5,739,811 and 5,734,373, both assigned to the assignee of this present application, and both hereby incorporated by reference herein.

Figure 5A:
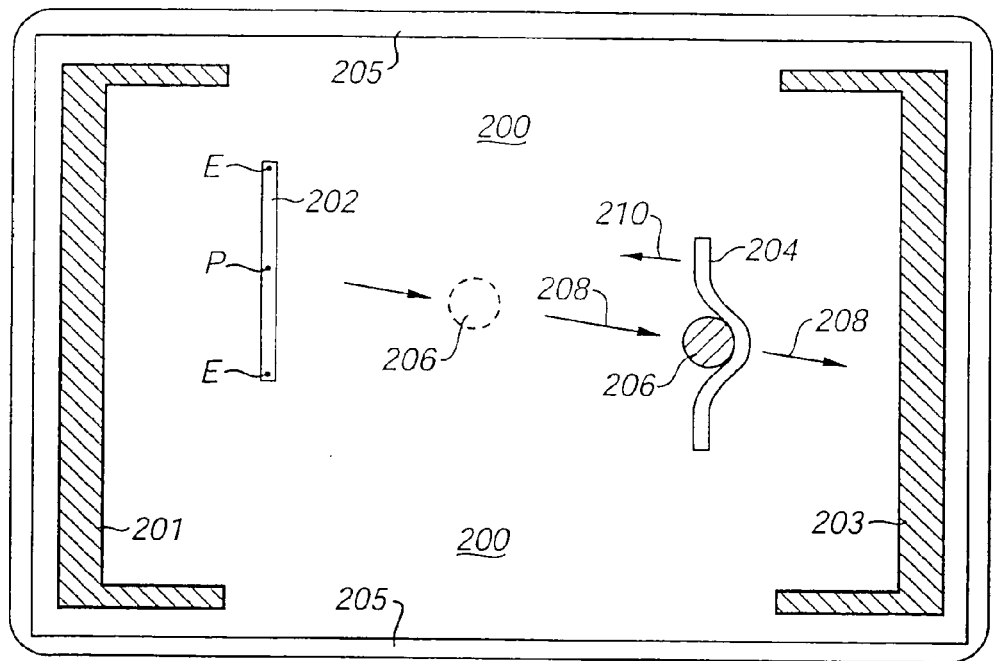
FIGS. 5a and 5b are diagrammatic illustrations of paddle and ball embodiments displayed on a display device of a simulation of the present invention.
Figure 5B:
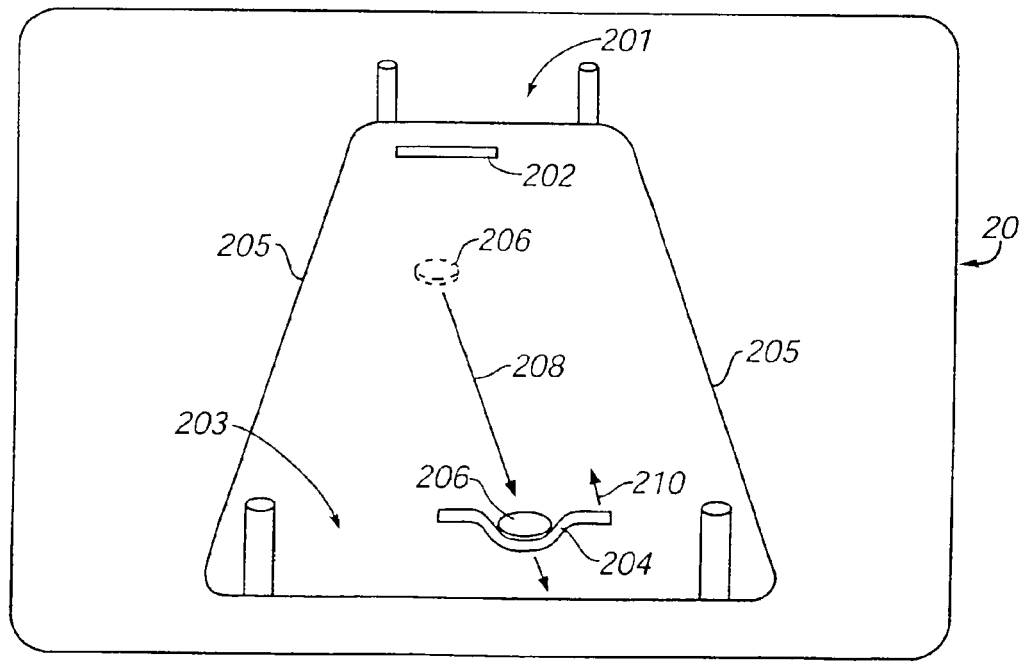

FIGS. 5a and 5b are diagrammatic illustrations showing one embodiment of a sporting environment of the present invention. This embodiment is a "pong" style game in which one or more players control a simulated object, such as a "paddle", to interact with another simulated object, such as a ball or puck, and score points in a game. This embodiment is preferable implemented such that the position of the paddle is mapped directly to the position of the user object 34 in a position control paradigm.

For the purposes of the present invention, there are preferably two primary modes or "control paradigms" (or "mappings") of operation for a force feedback interface device: rate control and position control. While the difference between rate control and position control is generally subtle to the user while he or she interacts with an application, the difference may be profound when representing force feedback information. While certain force feedback entities may be implemented under both control modes, classifying force feedback simulations into two types can help to avoid confusion among developers of force feedback applications.

Rate control refers to a user object mapping in which the displacement of the physical user object 34 along one or more provided degrees of freedom is abstractly mapped to motion of a computer-simulated entity under control, such as an airplane, race car, or other simulated "player" or player-controlled simulated object. Rate control is an abstraction which makes force feedback less intuitive because there is not a direct physical mapping between user object motion and commanded motion of the simulated computer entity. Nevertheless, many interesting force feedback sensations can be implemented within rate control paradigms. In contrast, position control refers to a user object mapping in which displacement of a joystick handle or other user-manipulable object directly dictates displacement of a simulated computer entity, so that the fundamental relation between joystick displacements and computer displacements is present. Thus, most rate control paradigms are fundamentally different from position control in that, using rate control, the user manipulatable object can be held steady at a given position but the simulated entity under control is in motion at a given commanded velocity, while the position control paradigm only allows the entity under control to be in motion if the user object is in motion.

For example, a common form of rate control is a velocity derived abstraction in which displacement of the user object dictates a velocity of the simulated computer entity, such as a vehicle or other simulated object displayed on display device 20 in a simulated environment. The greater the joystick handle is moved from the original position, the greater the velocity of the controlled vehicle or player-controlled simulated object. Such control paradigms are very popular in computer games where velocity of a spacecraft or race car is dictated by the displacement of the joystick. Like most rate control paradigms, velocity control allows the joystick to be held steady at a given position while the entity under control is in motion at a given commanded velocity. Other common rate control paradigms used in computer games are acceleration controlled. An acceleration controlled paradigm is termed "thrust" control by those skilled in the art. While velocity control dictates the speed of the entity under control, thrust control dictates the rate of change of speed. Under thrust control, the joystick can be still and centered at zero displacement, yet the commanded computer entity can be in motion.

In force feedback schemes, rate control force feedback commands roughly correspond to forces which would be exerted on a vehicle or other simulated entity controlled by the simulated environment through the force feedback interface device 14. Such forces are termed vehicle-centric forces. For example, in a thrust control paradigm, a user's simulated speed boat may move into thick mud, but the user would not directly feel the mud. However, the user would feel the speed boat's engine straining against a force opposing the boat's motion. These opposing forces are relayed to the user through interface device 14. Other simulated characteristics or objects in the simulated environment can have an effect on the player-controlled simulated entity and thus affect the forces output to the user.

In contrast, "position control" refers to a mapping of a user object in which displacement of the joystick handle or other user object directly dictates displacement of a computer-simulated entity or object. The mapping can have an arbitrary scale factor or even be non-linear, but the fundamental relation between user object displacements and computer object or entity displacements should be present. Under a position control mapping, the computer-controlled entity does not move unless the user object is in motion; a static user object dictates static commands to microprocessor 26 from host computer 12.

Position control is not a popular mapping for traditional computer games, but can be very important for computer simulated sporting interactions and other similar types of simulations. Position control is an intuitive and effective metaphor for force feedback interactions because it is a direct physical mapping rather than an abstract control paradigm. In other words, because the physical user object experiences the same physical manipulations as the entity being controlled within the computer, position control allows physical computer simulations to be directly reflected as realistic force feedback sensations. Thus, position control is much more able than rate control to allow for natural dexterous activity of users within simulated environments. Examples of position control in computer environments might be controlling a paddle in a pong-style tennis game or controlling a cursor in a windows desktop environment.

Contrasted with rate control's vehicle-centric forces, position control force feedback roughly corresponds to forces which would be perceived directly by the user. These are "user-centric" forces. For example, a paddle displayed on display device 20 and directly controlled by a user might move through simulated thick mud. Via the force feedback interface device 14, the user would perceive the varying force associated with movement through a viscous solution. Corresponding to the realistic physical situation, the force varies with the speed of motion of the joystick (and displayed paddle) and orientation of the paddle face.

FIG. 5*a* is a diagrammatic illustration of a 2-D implementation of displayed simulated objects on display device 20 in an example of a sporting simulation or game of the present invention. A playing field 200 is displayed in which action is to take place, and two goals 201 and 203 are provided on the playing field. Two paddles 202 and 204 are displayed which are moved around the playing field. Paddles 202 and 204 are shown as vertically-aligned segments having a length and a relatively small width. In other embodiments, paddles 202 and 204 can be oriented and/or shaped quite differently from the embodiment of FIG. 5*a*. For example, other geometric shapes, images of tennis rackets, or images of a person holding a tennis racket can be used in place of paddles 202 and 204. Paddles 202 and 204, ball 206, goals 201 and 203, and any other computer-generated objects that are included in the simulation are generically referred to herein as "simulated objects" (or "graphical objects" for objects that are displayed). In some embodiments, even playfield 200 or other background can be considered a simulated object with which paddle 204 may interact.

Paddles 202 and 204 can be constrained to certain areas of the playing field 200 or in particular degrees of freedom, or might not be constrained at all. For example, paddle 204 might be able to be moved only to a half-way point across the width of a display screen 20. Or, the paddles might be constrained to only one degree of freedom, such as up-down (or right-left) movement. Also, preferably a playing field boundary 205 is provided through which paddles 202 and 204 may not pass. In a one-player game, only one of the paddles is controlled by the user with interface device 14. For example, paddle 202 can be controlled by host computer system 12 or other computer system, and paddle 204 can be controlled by the user by physically manipulating the user object 34 in a position control paradigm.

Ball 206 can be moved on display device 20 according to simulated physical parameters, such as velocity, acceleration, gravity, compliance of objects, and other parameters as discussed below. When the ball 202 collides with paddle 204, the paddle preferably flexes, and the user feels the collision force on user object 34. For example, if ball 206 is moving in direction 208, then the user feels a force in the equivalent degrees of freedom of user object 34. In some embodiments, both the paddle 204 and the ball 206 can be moved in direction 208 (and forces can be applied to user object 34 in its equivalent direction) to simulate the paddle being pushed back by the ball. This interaction is described in greater detail with respect to FIGS. 6*a*-6*i*. In alternate embodiments, other shapes, sizes, or forms of simulated objects can be used in place of or in addition to ball 206, such as a puck or other disc-shaped object, cone, projectile, boomerang, or other shapes. All of these forms of simulated objects can be considered "ball objects".

The user can also move the user object 34 of the interface device so that the paddle 204 moves, for example, in a direction 210. Forces are generated on user object 34 such that the user will feel like he or she is "carrying" the weight of the ball, as in a sling. When the paddle 204 is slowed or stopped by the user, the ball continues to travel. The ball will thus be released from the paddle and move toward the other paddle 202 approximately in direction 210. As is well known in the field of video games, an objective in such a game might be to direct the ball into an opposing goal. Thus, the user can try to direct the ball into goal 201, and the host computer can control paddle 202 to attempt to direct the ball into goal 203. Paddles 202 and 204 are also used to block the ball from moving into the defended goal and to direct the ball back at the desired goal. By moving the paddle in a combination of direction 210 and up and down movement (with reference to FIG. 5a), and receiving information through force feedback concerning the weight of the ball and other simulated physical parameters, the user can influence the movement of the ball to a fine degree, thus allowing a player's manual skill and dexterity to influence simulation interactions and results to a greater degree than in previous simulations without force feedback.

In addition, other features can be included to further influence the ball's direction and the forces felt by the user. For example, the orientation of the paddle might be changed by rotating the paddle about a center point P of the paddle or a different point on the paddle, such as an endpoint E. This rotation might be sensed from a rotary "spin" degree of freedom of the user object 34 about an axis. Force feedback could also be appropriately applied in that spin degree of freedom. Other features can also be provided, such as allowing a ball to "stick" to a paddle when the two objects collide and/or when a button is pressed by the user. The user could then activate the button, for example, to release the ball from the paddle at a desired time. This is described in greater detail with respect to FIGS. 12a-c.

The force feedback provided to the user can be extended beyond the interaction of the paddle and ball as described above to the interaction between the paddle and "walls" and other objects of the playing field/simulated environment. Thus, for example, when the user moves paddle 362 against an object such as another paddle, the user "feels" the collision between the paddle 362 and the other object as a physical resistance on the user object of the interface device being used to manipulate the paddle's motion. This physical sensation is experienced in concert with the visual feedback on display device 20 showing the sudden cessation of the paddle's motion at the obstruction. More generally, the present invention provides a simulated environment in which a user manipulates a displayed simulated object and wherein the interaction of the displayed simulated object with another simulated object produces force feedback to the user that accurately represents the interaction between the simulated entities. The interaction between paddles and wall-like obstructions is detailed with respect to FIGS. 7a-7c and 11a.

In a different embodiment, paddle 202 can be controlled by a second user rather than host computer 12. For example, a second interface device 14 can be connected to another input/output port of host computer 12 and can be used by a second user to control paddle 202. Each player would therefore feel the forces on their respective paddle/user object from the ball directed by the other player. The third-person (or "birds-eye") view of the playing field 200 shown in FIG. 5a is often suitable for multi-player play at a single computer site where all players simultaneously view a single display device 20. Alternatively, multiple display devices 20 can be coupled to host computer 12.

Furthermore, the second interface device 14 need not be connected to computer 12. Instead, host computer 12 can be coupled to a second host computer 12 through a direct or network interface, as is well to those skilled in the art, and the second interface device can be coupled to the second host computer. The movement of the first user object would thus be communicated from the first host computer to the second host computer, which would then command forces on the second user object caused by the first user object, if appropriate; and vice-versa. Such an embodiment is described in greater detail with respect to FIG. 20.

In addition, if the two paddles 202 and 204 were brought into contact with one another, each player could feel the direct force from the other player on his own user object. That is, a first user's force on his user object would cause his paddle 204 to move into the other paddle 202, which would cause both the first and second users to feel the collision force. If the first paddle 204 were allowed to push the other paddle 202 across the screen, then the second user would feel the first user's pushing force. The first user would feel similar forces caused by the second user. This creates the effect as if each player were pushing the other player directly. Such pushing or "tug of war" games between two users can take several different embodiments. Interactions between multiple paddles and the resulting forces are described in greater detail with respect to FIGS. 8a-c and 9a and 9b.

In other embodiments, additional features can be added to the sporting simulation. For example, goals in addition to goals 201 and 203 can be displayed. The goals can also be provided as different shapes or can have characteristics of their own, such as simulated mass or compliance. Also, multiple balls 206 can be implemented, of the same or differing characteristics and which might each be worth a different point score when moved into a goal. A player might be also allowed to control the movement of ball 206 in some fashion. Also, more than two paddles 202 and 204 can be provided. For example, 2 or more players can each control a paddle to defend one goal 203, and an equal number of players can control paddles to defend the other goal 201. In yet another embodiment, a single user can control two or more interface devices 14; for example, a user could control the simulated left glove of a boxer using a force feedback interface device controlled by the user's left hand, and a separate force feedback interface device with the user's right hand for the boxer's right glove.

FIG. 5b shows a similar embodiment to that of FIG. 5a in which a simulated perspective view (or simulated 3-D view) of the simulated objects of paddles 202 and 204 and ball 206 are shown displayed on display device 20. This is a "first-person" or "immersive" view in which the player views the field as if the player were standing in or in front of the field, facing the other player or goal. In this embodiment, the ball 206 can be a sphere (which can optionally bounce from objects or the playing field), or a "puck" or disc-shaped object which can slide along the playing field like a hockey puck. The embodiment of FIG. 5b is quite suitable for a networked embodiment, where each user can, on his own display device 20, view paddle 204 as the paddle under his own control and paddle 202 as the other player's paddle.

FIGS. 6a-6i are diagrammatic illustrations of a "paddle" simulated object 220 interacting with a "ball" simulated object (or similar object) 206. These computer objects can be displayed on a display device 20 by a computer, such as host computer 16 or other computer system, and are suitable for use in a computer-generated simulation of the present invention, such as the "pong" embodiment of FIGS. 5a-5b. The force interactions between the ball and paddle can be controlled by a software developer using a host command, as explained below. In the described example, paddle object 220 is controlled by a player by a position control paradigm such that the movement of paddle object 220 is directly mapped to movement of user object 34. In alternate embodiments, ball object 206 or both objects can be controlled by players.

Figure 6A:
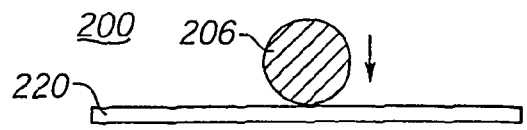
FIGS. 6a-6i are diagrammatic illustrations of a paddle and ball interaction of the present invention.
Figure 6B:
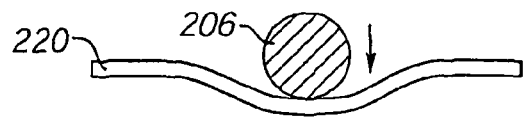
Figure 6C:
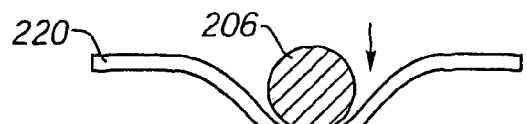

FIGS. 6a-6h show how paddle object 220 interacts with a moving ball object 206 as ball object 206 collides with the paddle object. In FIG. 6a, ball 206 first impacts paddle 220. Preferably, an initial force is applied to user object 34 in the appropriate (corresponding) direction of the ball's movement. In FIGS. 6b and 6c, ball 206 is moving into the compliant paddle or "sling." Preferably, a force based on a simulated mass of ball 206 (and/or other simulated conditions) is felt by the user through user object 34 which is appropriate to the simulated velocity of the ball (and/or the paddle), the simulated compliance of the paddle (and/or the ball), and the strength and direction of simulated gravity. In a local microprocessor embodiment, as described in FIG. 4, these factors (and other desired physical factors) can preferably be set using a host command with the appropriate parameters, as described in U.S. Pat. No. 6,219,032. For example, parameters of objects can be specified and simulated such as mass of the ball, velocity of the ball, the strength of gravity, the direction of gravity, the compliance or stiffness of the paddle object 220, damping forces to the collision between the ball and paddle, a simulated mass of the paddle 220, and other parameters to control other physical aspects of the computer environment and interaction of objects. In addition, the ball 206 can be displayed as a compressed object when it impacts paddle 220, with, for example, an oval or elliptical shape. Also, the parameters such as the compliance and/or damping of the paddle might be allowed to be adjusted by the user with other input 39 or an additional degree of freedom of a user object 34 manipulated by the user.

Figure 6D:
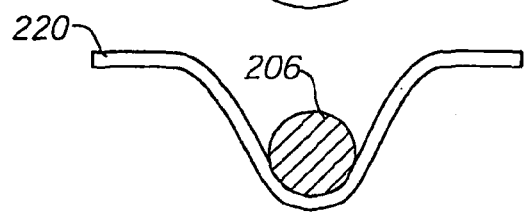
Figure 6E:
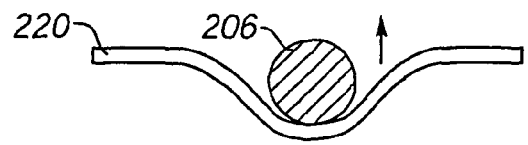
Figure 6F:
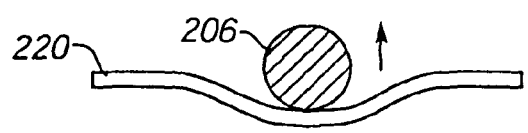
Figure 6G:
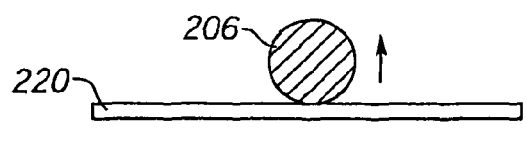
Figure 6H:
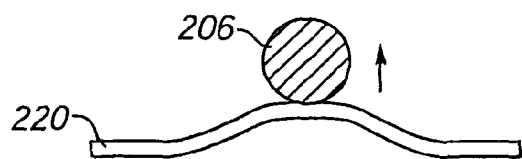

In FIG. 6d, the ball has reached a maximum flexibility point of paddle 34 and can no longer move in the same direction. As shown in FIGS. 6e through 6g, the ball is forced in the opposite direction due to the compliance and simulated springiness of the paddle. In addition, the user may preferably exert force on user object 34 to move paddle 220 and direct the ball in a certain direction and to add more velocity to the ball's movement. This allows the user a fine degree of control and allows a significant application of skill in directing the ball in a desired direction. In addition, the paddle 220 can optionally flex in the opposite direction as shown in FIG. 6h. The force feedback paddle is thus an improved component of "pong" type and other similar video games.

Other physical characteristics can also be simulated between interacting simulated objects such as ball 206 and paddle 220. For example, a frictional force can be provided in directions perpendicular to the direction of impact when the ball collides with the paddle. Such a frictional force can be modeled using simulated ball and paddle masses, a simulated coefficient of friction, the velocities of the ball and paddle, and other physical characteristics as desired. This frictional force can add an extra dimension to a sporting simulation or game. For example, by manipulating the frictional engagement of ball and paddle, a player can put a "spin" on the ball after the player's paddle contacts the ball (i.e., to cause the ball to move away from the paddle after collision and to cause the ball to rotate about an axis that extends through the ball as the ball is moving through space).

An interface apparatus providing two linear (X and Y) degrees of freedom to user object 34 as well as a rotating ("spin") third degree of freedom about a Z axis is quite suitable for the paddle-ball implementation. Linear degree of freedom apparatuses are disclosed in U.S. Pat. Nos. 5,721,566 and 5,805,140, previously incorporated herein, and further embodiments of such are described below.

Figure 6I:
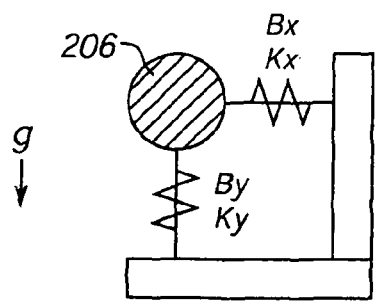

A schematic model of the forces interacting between ball 206 and paddle 220 is shown in FIG. 6i. A spring force indicated by spring constant K is provided in both degrees of freedom X and Y to indicate the springiness of the paddle 220; g is a gravity direction. In addition, a damping force indicated by damping constant B can be provided to slow the ball 206 down once it contacts paddle 220. Alternatively, the spring and damping forces can also be applied in only one degree of freedom. A frictional force can also be provided, as described above.

The paddle control algorithm is a dynamic algorithm in which interaction forces are computed while a ball compresses the paddle and then releases from the paddle. In a local microprocessor embodiment of FIG. 4, a paddle command can be sent by host computer 12 when the ball contacts the paddle. The paddle command reports ball location to the host computer so that the host can update graphics displayed on display device 20 during the interaction period. In presently preferred embodiments, the updates only need to be provided at about 60-70 Hz to the host, since most displays 20 can display images at that refresh rate. However, the forces should be computed and output at about 500 Hz or more to provide a realistic "feel" to the interaction. Optionally, a local microprocessor 26 may compute the forces quickly while occasionally reporting the sensor readings of the paddle to the host at a slower rate. Other types of video game or simulation interactions can also be commanded with a high-level host command in a similar fashion. In addition, in other embodiments, host computer 12 can control the actuators 30 directly to implement the paddle and ball force feedback, without sending any high level host commands.

FIGS. 7a-7c are diagrammatic illustrations of a user-controlled simulated object interacting with a simulated obstruction object in accordance with the present invention. An obstruction such as a virtual "wall" or other obstruction object displayed on playing field 200 will provide forces on the user-manipulated physical object when the user-controlled simulated object (e.g., paddle) visually contacts or impacts the obstruction. This collision can be physically simulated to the user as an obstruction force on the physical user object 34 in the direction of the wall, as described above with reference to FIG. 3. Ideally, to simulate a solid and impenetrable wall, this force should make movement in the direction of the wall impossible, i.e., the wall should provide a force of near-infinite magnitude opposing the motion of the physical user object in a direction equivalent to the direction of the wall. However, due to practical constraints of safety, size, and cost, the maximum magnitude of force applied to the user object is typically much smaller; small enough, in fact, that the user can often overpower the obstruction force. When the user can easily overpower the obstruction force, it feels as if the wall does not substantially exist, and the continuity and effectiveness of the simulation is lost. This results in a much less realistic simulated environment.

According to one embodiment of this aspect of the invention, the loss of realism in the simulation due to a user overpowering an obstruction force is mitigated by "breaking" the mapping between the position of the physical object 34 grasped and manipulated by the user and the position of the paddle in the simulation and on the display. There are three aspects to a position control mapping: the location of the simulated object within the simulation, the location of the simulated object as displayed by the display device, and the position of the physical user object in provided degrees of freedom. Normally in the paddle and ball embodiments as disclosed above, a position control paradigm is used, where the position of the physical object 34 of the user interface is directly correlated or mapped to the location of the user-controlled simulated object within the simulation and the location of the simulated object as displayed on display device 20. "Breaking" this mapping means, herein, that the position of the physical object will not be directly correlated to the location of the user's simulated object. The breaking of the physical-simulated mapping is accomplished under conditions that allow the user to realistically experience an obstruction interaction even though the obstruction force can be overpowered by the user.

FIG. 7a illustrates the user controlling a physical user object of an interface device (shown generally at 230), such as described above. In the described example, the interface device includes a user object that may be moved linearly along a device x-axis 235. Alternatively, the user object can be moved in a rotary degree of freedom. The interface device 230 sends commands to a computer simulation that implements a user-controlled simulated object (shown here as paddle 236) that is displayed on a playing field 232 on display device 20. The playing field 232 includes a playing field boundary obstruction 234 and a free-standing obstruction 238, both of which are intended to completely impede the movement of paddle 236 in the direction of those obstructions. The horizontal coordinate of paddle 236 along a display x-axis 237 is indicated by dashed line 240, which is at location $x_1$ initially. The movement of the user object of interface device 230 along device x-axis 235 causes the movement of paddle 236 along display x-axis 237 in a position control paradigm. It should be noted that, in the embodiments disclosed herein, although the motion of the user object in physical space is correlated to the movement of paddle 236 in simulation space, this correlation may or may not be exact in terms of distance. For example, user object 34 can be moved one inch, and the paddle 236 might be moved a corresponding one inch in the simulation and on the display device. Alternatively, and more commonly, a scale factor or other relationship is used so that the physical distance is converted to a simulation distance that does not equal the physical distance in terms of physical measurement. Thus, one inch in physical space might equal 5 pixels in simulation space, which may vary in terms of inches depending on the size of the display device.

As shown in FIG. 7b, the user moves paddle 236 to position $x_2$, which is at the front "face" of the obstruction 238; the paddle is not intended to be allowed to move past this position in the direction of the display x-axis 237. As shown in FIG. 7c, the breaking of the mapping between the location of the paddle and the physical position of the user object occurs after position $x_2$. As displayed on the display device 20, the paddle 236 remains "blocked" at the position $x_2$ while the user continues to move the physical object 34 in direction 240 to a position equivalent to displayed position $x_3$, past the position on device x-axis 235 corresponding to position $x_2$ of obstruction 238. That is, the physical object is moved to exceed the result (the collision in this example) of the interaction between paddle 236 and obstruction 238. There is thus a discontinuity between the visual and physical experiences of the user that would normally cause a loss of realism in the simulation as the user would be aware of this distinctly "non-physical" result. To alleviate this discontinuity, a restoring force F of the present invention is applied to the physical user object by actuators of interface device 230 along device axis 235 in the direction opposite to direction 240, opposing the user's motion (or assisting the user's motion if the user begins to move the object 34 in the direction opposite to direction 240).

The restoring force F can be of any magnitude effective to produce a perception in the user that a rigid wall is present. In one embodiment, the restoring force F is implemented as an restoring spring force that increases in magnitude proportionally to the distance penetrated "into" or "through" the face of the wall. The greater the displacement past the wall, the greater is the restoring force that the user feels. This force, for example, can be of the mathematical form $F=kx$, where k is a constant and x is the above-described deviation between the simulated/visual and physical mapping. Thus, in the example of FIG. 6c, the user would feel a spring force F in a direction opposite to direction 240 which is equal in magnitude to kx, where x is the distance the user moved the user object through the wall on device x-axis 235 (equivalent to $x_3-x_2$ in simulation space).

Alternatively, a "damping force" proportional to the simulated velocity of the simulated object can be added to the spring force, where the total force is equal to the restoring force F. Such a total force can be expressed mathematically as $F=kx+bv$, where k is the spring constant just described, v is the simulated velocity (or a function of the simulated velocity) of the physical object of the user interface, and b is a damping constant. Another alternative restoring force includes a term corresponding to a paddle having a finite mass. Such a restoring force has the general form $F=kx+bv+ma$, where m is the simulated mass of the paddle and a is the relative acceleration of the physical user object with respect to the simulated obstruction with respect to the physical user object of the interface device 230. The magnitudes of k, b, and m can be determined using methods known to those skilled in the art of computer simulation, but should be chosen so as to provide a realistic sensation in the user.

If desired, the obstruction may also be modeled with a finite mass. If the free-standing obstruction 238 has a particular finite mass, the user may be able to "push" the obstruction with paddle 236 if the user provides enough force on the physical object of interface device 230 as determined by the simulated masses of paddle 236 and obstruction 238. Thus, a restoring force would include an inertial force in such a scenario. Other components can also affect the frictional component of the restoring force, such as simulated gravity, simulated friction of the simulated objects with the playfield, simulated texture and/or height variation in the playfield, and/or any other factors that the designer of the simulation wishes to include.

It has been found that, when the interaction of a user-controlled simulated object and a simulated obstruction is implemented as described above, the user perceives the collision of the user-controlled simulated object with the obstruction as a realistically simulated interaction between physically real objects. In other words, the user is largely unaware that the simulation has presented a non-physical result.

The method provides a simulated object that is controlled by a user object through a position mapping and which may collide with an obstruction. The simulated object does not visually move past the obstruction, even though the user object moves past the location where the interaction with the obstruction occurred. This, combined with the physical sensation of the restoring spring force (or other type of force applied to the user object), results in an effective, realistic illusion that a rigid wall is present through which the paddle may not pass. Importantly, this interaction allows a user to realistically experience the physical simulation even where the maximum magnitude of the restoring force is relatively small, as is often required for safe and practical operation of user interface devices.

In FIGS. 8a-c, the interaction between two moving simulated objects is illustrated. In one embodiment (as shown in FIGS. 8a-c), a first user controls one simulated object (e.g., paddle) using a first interface device, and a second user controls a second simulated object (e.g., paddle) using a second interface device (alternatively, a single user can control both interface devices). Each player preferably feels the forces generated by the other player's paddle on his own paddle, as discussed above in FIG. 5a.

FIGS. 8a-c illustrate a scenario in which two user-controlled simulated paddles collide. As seen in FIG. 8a, a playing field 250 is generated on a display device 20 by a computer 12 which is responsive to input from two interface devices 252 and 254. The computer displays paddles 256 and 258 in playfield 250 which have horizontal coordinates 260 and 262, respectively, along a display x-axis 261. The position and motion of paddle 256 on the display device 20 is controlled by input signals from interface device 252, and paddle 258 is likewise controlled by interface device 254. User objects 34 of the interface devices 254 may move along device x-axes 263 and 265, respectively. FIG. 8b illustrates the approach of paddles 256 and 258 along a collision trajectory as each user moves his or her own physical user object in opposite directions shown by arrows 267 and 269, respectively.

FIG. 8c shows the collision of the two paddles 256 and 258. In theory, collisions between two user-controlled simulated objects could be modeled to correspond to real-life collisions of objects. For example, if both paddles are moved with equal magnitude of force in exactly opposite directions, the two paddles should come to a complete stop, with infinite forces opposing the further motion of both physical user objects in their respective directions. If the first user moves his physical object with greater force than the second user, then the first user would move the second user's paddle with his paddle in accordance with the difference of forces exerted. However, as explained above, practical force feedback interface devices cannot generate infinite forces and cannot even generate very strong forces if the device is to be made practical and safe for user handling. Therefore, a different method is required to simulate the collision using smaller magnitude forces, as explained below.

As discussed above with reference to FIGS. 7a-c, a "breaking" of the mapping between physical user object positions and simulated object positions according to the present invention can be used when a user controlled simulated object impinges on an obstruction. A variation of this method can also be used when two user-controlled simulated objects interact. As shown in FIG. 8c, the motion of the physical user objects along device x-axes is allowed to continue past the point on display device 20 where the displayed paddles interact and are not allowed to move freely. The physical object of interface device 252 is moved an equivalent distance to distance x, on the display device. The distance $x_1$ is the distance that the paddle 256 would have moved on the display (and within the simulation) had there been no interaction between paddles, i.e., had the position control mapping been maintained. The physical object of interface device 254 is similarly moved an equivalent distance to distance $x_2$ on the display device, past the visual point of collision between the paddles, thus breaking the mapping between the position of the physical user object and the location of the user-controlled simulated object 258 in the simulation and on the display device. It should be noted that a similar collision can occur in other dimensions, e.g., the paddles 256 and 258 can collide at their endpoints rather than on their faces as shown in FIG. 8c; such interactions can be modeled similarly to the described interactions.

The application of an appropriate restoring force F to the users in combination with the appearance of collision in the visual display can produce the perception in the users of a collision between the paddles and a corresponding unawareness of the breaking of the mapping between user object and simulated object. In one embodiment, the restoring force can be provided as a spring force in directions opposite to directions 267 and 269, as described above in FIGS. 7a-c. The distance x in the above equation is replaced by the sum $x_1+x_2$, i.e., $F=k(x_1+x_2)$. Similarly, a damping force can be included so that the restoring force F has the form $F=k(x_1+x_2)+b(v_1+v_2)$. In yet other embodiments, a velocity term could be included so that the restoring force F has the form: $F=k(x_1+x_2)+b(v_1+v_2)$, where $v_1$ and $v_2$ are the velocities of the physical objects of interface devices 252 and 254, respectively.

The location of the paddles in the simulation and on the display device during this interaction can vary according to the present invention, depending on the user interactions involved. The two paddles, which are displayed engaged with one another, are preferably provided at a position located between the displayed equivalent positions of the two physical user objects. This position is reflected both on the visual display device and within the computer-generated simulation. For example, the engaged paddles can be provided at the mid-point between the two physical objects. For example, the two paddles 256 and 258 are displayed at the midpoint between the positions (in the simulation) of the two interface devices 252 and 254 in FIG. 8c. The paddles exist at this mid-point both on display device 20 and within the simulation; the paddles have been "moved" to this mid-point location for all further interactions in the simulation. The resulting location of the paddles can also be determined according to other relationships, such as one or more weighting factors of each individual paddle (discussed below).

In another embodiment, the paddles 256 and 258 can be provided with different "weights" so as to influence the position at which the engaged paddles will be provided after a collision. The position of the engaged paddles may be influenced more by the motion of one of the paddles if one paddle has a greater weight than the other. For example, if paddle 256 is assigned a weight of $w_1$ and paddle 258 is assigned a weight of $w_2$, then one weighting provides coordinates for the engaged paddles L according to the formula:

$$L = \frac{(w_1 x_1 + w_2 x_2)}{(w_1 + w_2)}.$$

The case where $w_1=w_2$ reduces to the situation discussed above and shown in FIG. 8c where the paddles are located at the mid-point between the position of the first physical object ($x_1$) and the second physical object ($x_2$). In other embodiments, the weighting factors can be such characteristics of the paddles as a spring constant, as described below.

This weighting factor can be used in variety of situations in sports simulations and simulations. For example, the weights can correspond to different strengths for "offensive" and "defensive" players in a simulated contact game such as football. A defensive player might have a stronger weight assigned to his paddle so that he could more effectively block and push offensive players. The defensive player's paddle would thus influence the location of two collided paddles more than the offensive player's paddle. In other embodiments, the host computer generating the motion simulation (or a different computer) can control the second moving simulated object instead of a second user. The computer's simulated object can be given a weight as well.

In still another embodiment, frictional forces can be included in interactions between simulated objects, such as paddle-obstruction interactions and paddle-paddle interactions. Such frictional forces can come into play when, for example, a paddle that is engaged with another simulated object (such as another paddle or a wall/obstruction) is moved in a direction perpendicular to the engagement and collision forces. In one embodiment, these forces are proportional to the difference in velocities of the interacting simulated objects. This is meant to reflect that, in general, the greater the force applied in pushing against an object, the greater the resistance to side motion is sensed. In another embodiment, the frictional force is proportional to the normal force between the interacting simulated objects. In still another embodiment, these forces are combined. In yet another embodiment, a vibration force or oscillation force can be provided on the user object 34 as a paddle slides along another object's surface to create the sensation of texture.

FIGS. 9a and 9b illustrate an example of a complex, multi-player simulation at 300. The inclusion of several players controlling a single simulation, whether such control is local, remote over a network, or a combination of local and remote, presents unique problems with respect to the execution of the above-described simulation as opposed to simulations being controlled by one or two players. In FIG. 9a, each of two paddles P1 and P2 are controlled by a user. Each paddle is defined by parameters including width (W), height (H), position (P), origin (J), and spring constant (K). In the described embodiment, the position P of each paddle is its position within the simulation and is defined as the center point of the paddle. The origin J is the desired position of the paddle as directly mapped to the actual position of the physical user object 34 of the interface device controlled by the user. Multiple paddles are "engaged", i.e., are visually interacting with each other and can exert simulated forces on each other. As described above with reference to FIGS. 8a-c, a restoring force is provided as a spring force on each paddle, represented by springs 290 and 292, to provide the user with the feeling of an obstruction. Thus the paddle within the simulation and on the display screen is mapped to P, while the user object is mapped to J, and K is a spring constant that defines a restoring force that is based on the deviation between P and J. The engaged paddles share an equilibrium ("equ") position 294. The location of the equilibrium position is determined by the position of origin J of the engaged paddles and the spring constant K of the two paddles. For example, the K's of different amount may weight the equilibrium position closer to one paddle than the other. In one embodiment, a relationship such as the weighting factor relationship shown above with respect to FIGS. 8a-8c can be used to determine equilibrium position, with, for example, the spring constants K used as weighting factors. The position P is then determined from the equilibrium position, based on the width W (or height H, if paddles are engaged endpoint-to-endpoint) of the paddles, and the characteristics of the engagement, such as which paddle is on the left and which is on the right.

In FIG. 9b, a playing area 301 is defined by walls 302 and 303 which may also include segments 305 and 307 that are "transparent" to certain simulated objects within the playing area, such as ball 604 (i.e., ball 304 may move through segments 305 and 307, but not through paddles). Within the playing area are ball 304, paddles 306 (shown in an elongated state from its interaction with ball 304), 308, 310, 312, 314, and 318, and obstructions 315, 316. As in FIG. 9a, each paddle is defined in part by the parameters width (W), height (H), position (P), origin (J), and spring constant (K). Walls 302 and 303 and obstructions 315 and 316 have similar characteristics to paddles and have parameters including a width (W), height (H), position (P), origin (J), and spring constant (K). However, the walls and obstructions preferably have a constant J (since they are not mapped to a user object) and a relatively large K compared to the K for the paddles. Each paddle i is illustrated as having a display position $P_i$, and a position $J_i$ corresponding to the actual position of the player's user object of the interface device. The "spring" connecting the points $P_i$ and $J_i$ represents the above-described restoring force used to provide the user's force feedback, in addition to any forces acting on the paddle from interactions with other objects (e.g., the ball or other paddles). This spring has an effective "spring constant" $K_i$. These quantities are shown in FIG. 9b for paddle 306 (paddle 1). An interaction occurs when any number of paddles and/or walls are engaged, as shown in FIG. 9b, where paddle 1 is engaged with paddle 2, paddle 2 is engaged with paddle 3, paddle 3 with paddle 4, paddle 4 with paddle 5, and paddle 5 with obstruction 315. For example, this interaction is of size 6; the interaction between paddle 6 and obstruction 316 is of size 2. Any non-engaged paddle or obstruction can be considered an interaction of size 1.

The determination of positions $P_i$ from a given set of $J_i$ and $K_i$ values for a system as complex as that shown in FIG. 9b can be a computationally expensive task, in which potentially large linear systems must be determined from a knowledge of the forces acting on all of the simulated objects at each "moment" of the simulation. Such calculations risk degrading the simulation quality through computation bottlenecks. However, in one embodiment, the present invention includes a calculation strategy that makes such calculations highly tractable.

In general, restoring forces (F=KX=K(J–P)) must be supplied for paddles undergoing some type of interaction (e.g., a collision) in which the motion of the paddle is obstructed or hindered (e.g., by contact with a simulated wall or another simulated paddle); such paddles can be said to be at equilibrium. By using the fact that, at equilibrium, the sum of the forces acting on a set of n obstructed paddles is zero ($\Sigma F_i$=0), and assuming the paddles have no thickness (generally, a fair assumption as the width of the paddles is small in comparison to the dimensions of the playing area), the equilibrium positions of the n interacting paddles are approximately the same, i.e., $P_1=P_2=\ldots=P_n$. Applying this equality to the relation defined above for the restoring force allows the positions of the paddles to be readily determined:

$$P_i = \sum_i F_i = \sum_i K_i J_i. \tag{1}$$

Normalizing the sum (1) above with a weighing factor of K provides:

$$P_i = \frac{\sum_i K_i J_i}{\sum_i K_i}. \tag{2}$$

Having determined $P_i$, the widths of the paddles can be added to Pi to determine the actual positions of the paddles in the simulation and on the display device.

Figure 10:
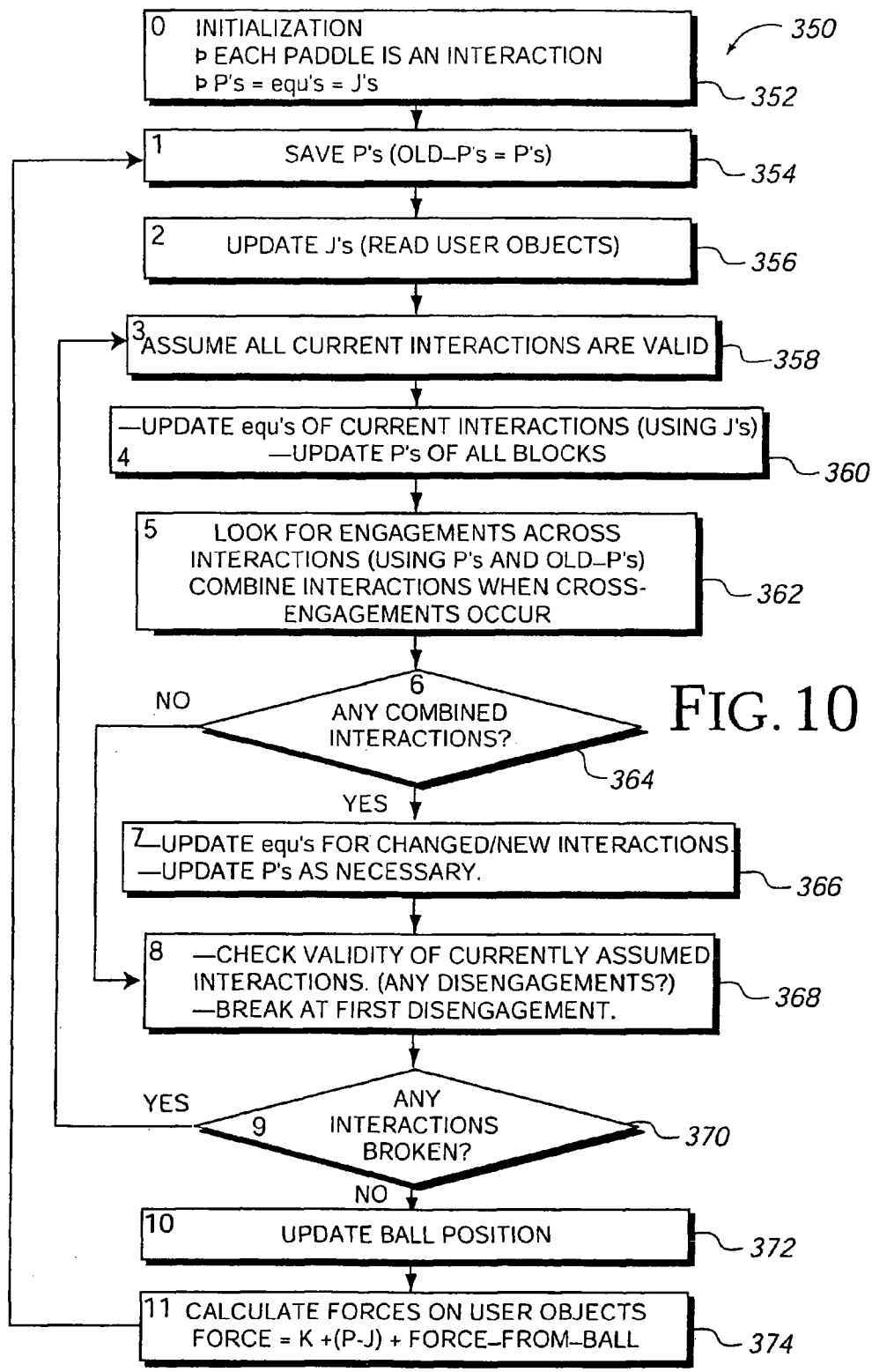
FIG. 10 is a flow diagram illustrating a method for determining force feedback for multiple interacting user-controlled simulated objects.

FIG. 10 is a flowchart illustrating a method 350 of implementing the above-described paddle interactions. Beginning at step 352 an initialization procedure is performed in which each paddle is determined to interact with itself (interaction size of 1) and the equilibrium positions ("equs") of the paddles are set to their respective J values. At step 354, a loop is initiated in which the P values of the paddles and obstructions are saved. At step 356 the J values of the paddles and obstructions are updated. J values for the paddles are determined from input received from the user interface devices, such as the current position of the user object 34. J values for the obstructions are constants assuming, as in the present example, that the obstructions are not controlled by user objects. At step 358 the error state of all interactions is set to null (i.e., all interactions are assumed to be valid). At step 360 the equilibrium positions (eqs) of the paddles and obstructions are updated in accordance with the updated J values. Using the updated eqs, the positions P of the paddles and obstructions can be updated.

At step 362, the process checks for multiple interactions that should be combined into a single interaction. A determination is made as to whether any engagements across interactions have occurred, i.e., if any paddle or obstruction in one interaction engages a paddle or obstruction in a separate interaction. The engagements are determined using new and old positions P. If any cross-engagements have occurred, the corresponding interactions are combined. For example, paddle 3 is engaged with paddle 2, and is also engaged with paddle 4. These two separate interactions are combined into a single interaction. At step 364 a determination is made as to whether any combined interactions were made in step 362. If so, then, at step 366 the eqs and P values are updated as necessary. If the answer at step 364 is no, or following step 366, the validity of all assumed interactions is checked in step 368 by ascertaining whether any two previously engaged blocks are no longer engaged (e.g., by examining the new P values of the paddles). At the first inconsistency (disengagement) in an interaction, the paddles or obstructions are broken into two separate interactions. At step 370 a determination is made as to whether any interactions were broken in step 368. If so, then control returns to step 358 to calculate P and equ values. If no interactions were broken, the ball position is updated (if appropriate) at step 372 and the forces on the user objects of the interface devices are calculated at step 374 using the formula $$F_j = K(P-J) + F_b$$

where $F_j$ is the force on the input device, K, P, and J are the quantities described above, and $F_b$ is the force supplied by the ball. The simulation for the current time step is thus complete and the process returns to step 354.

Figure 11A:
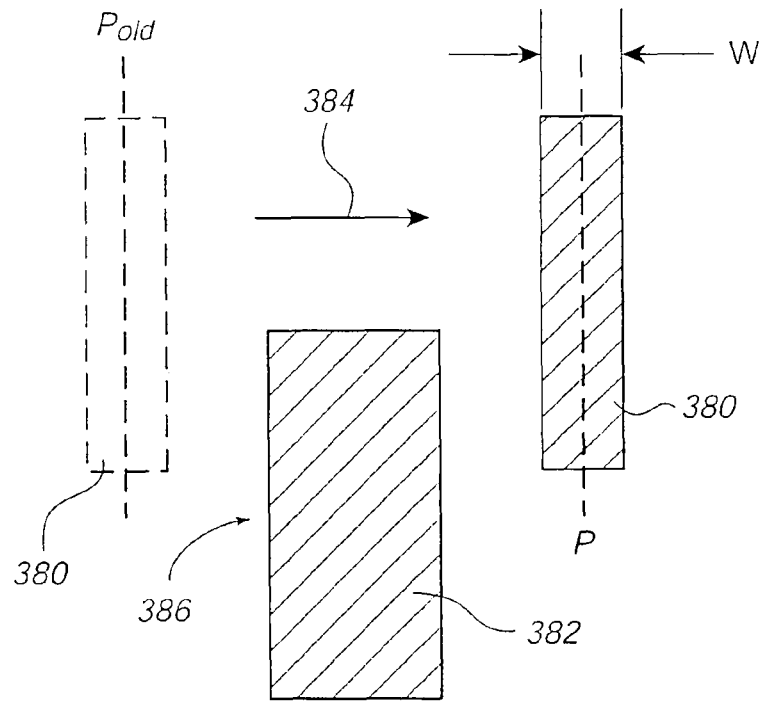
FIGS. 11a-b are diagrammatic illustrations illustrating the engagement of simulated objects in the present invention.

FIG. 11a is a diagrammatic illustration of a paddle interacting with an obstruction object, such as a wall. Calculation issues exist for interactions between simulated objects for determining when the interactions occur. For example, the descritization of time in computer simulations requires that dynamic events among moving objects, such as collisions, be determined at isolated steps in the simulation. Thus, interactions between objects may be missed, e.g., if the granularity of simulation is too great and/or if the velocity of one or more of the simulated objects is too great. To reduce the overlooking or missing of an interaction due to the discrete time steps of the simulation, various methods can be implemented.

One method for determining interactions between a user-controlled moving object (paddle) and a stationary object (e.g., an obstruction) is to examine the current and previous positions of the moving object. In FIG. 11a, paddle 380 has a current position shown as position P, and a previous position shown as position $P_{OLD}$. By the time the controlling computer reads the position of the user object, the paddle is positioned at P. However, a collision should have occurred with the obstruction 382 which is positioned between the old and current positions of the paddle 380. Thus, by examining the old position and the current position, the computer can determine the direction of travel of paddle 380 (indicated by arrow 384) and can determine if a collision should have occurred. If so, the simulation can be updated accordingly. For example, paddle 380 can be moved to a position engaged with the front face 386 of obstruction 382, with the appropriate force output on user object 34.

Figure 11B:
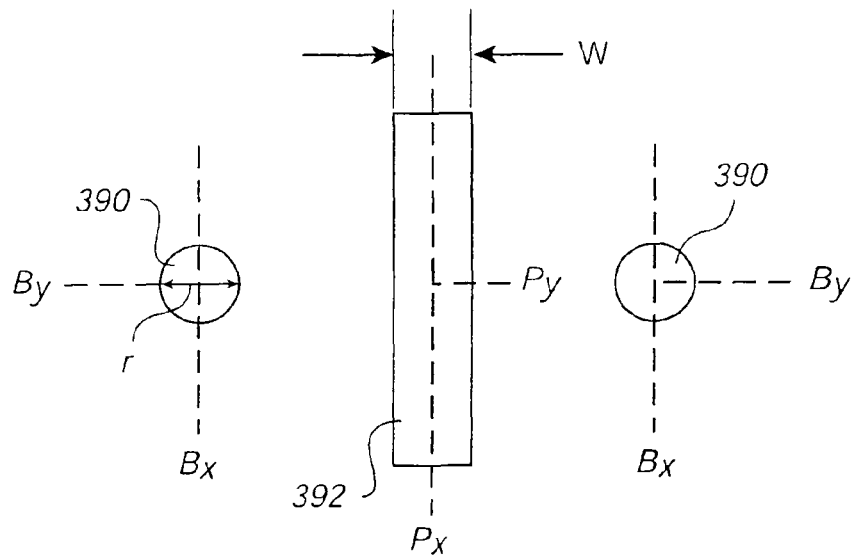

FIG. 11b is a diagrammatic illustration showing the interaction between a paddle and a ball. There are additional issues when trying to determine interactions between two moving simulated objects, since both objects may have a large velocity, further causing missed interactions. One method of reducing missed interactions is to interpolate the trajectories of the simulated objects between the current and immediately preceding locations of the objects in the calculation, similar to the interaction of FIG. 11a. However, such calculations are computationally intensive when both objects are moving. The present invention provides a different method for estimating the occurrence of interactions between moving objects (and also can be used when one object is moving and one is stationary) which is reasonably accurate and computationally efficient.

In general, a moving simulated object (e.g., a ball 390) can be to the right or the left of a second moving simulated object, such as paddle 392, as shown in FIG. 11b. Accounting for the width of the paddle, w, and the radius of the ball, r, the following inequalities can be derived:

$$B_x + r < P_x - w \quad (3)$$

$$B'_x + r > P'_x - w \quad (4)$$

$$|B'_y - P'_y| \leq r + w \quad (5)$$

where $B_x$, $B_y$, $P_x$, and $P_y$ are the x and y coordinates of the ball and paddle, respectively, at time t. The primed values indicate the corresponding values at time $t+\Delta t$. For the case of paddle-paddle interactions, the inequalities are:

$$P_{1x} + w_1 < P_{2x} + w_2 \quad (6)$$

$$P'_{1x} + w_1 < P'_{2x} + w_2 \quad (7)$$

$$|P'_{1y} - P'_{2y}| \leq w_1 + w_2 \quad (8)$$

It will be appreciated by those of skill in the computing arts that this description can be generalized to cover vectors generally.

Using the above relationships, a collision can be estimated without computationally intensive calculations. With respect to the ball-paddle interaction, if condition (3) is true (i.e., the ball is approaching from the left), and conditions (4) and (5) are met, then a collision or engagement is said to have occurred. Similarly, for paddle-paddle interactions, if condition (6) holds at time t (the first paddle is approaching the second paddle from the left), and conditions (7) and (8) are met at time $t+\Delta t$, then the paddles are said to have engaged. Similar conditions can be derived for more general scenarios.

Two conditions can produce erroneous results with this method. First, if the first simulated object (ball or paddle) moves within a time step such that the first object is outside the boundaries of the second object at time t, crosses the path of the object, but concludes its motion outside the boundaries of the second object at time $t+\Delta t$, no interaction will be found. The time steps of the simulation are too large, or the velocity of one or both of the objects is too high, to register the interaction. Second, if the first object is outside the boundaries of the second object at time t, but crosses the path of the object ahead of the object at time $t+\Delta t$, a collision or engagement could incorrectly be determined to have occurred. Both of these scenarios are avoided if interpolation is used to determine object trajectories. However, if the simulation time steps are small enough, then the above-described method of the present invention will provide reasonably accurate estimates on the occurrence of collisions without requiring complex interpolation calculations.

Once it is known whether the ball and paddle have engaged, the simulated force on the ball is calculated. One example for calculating this force is provided using the following equations:

$$Fx_{ball} = -K_x(Ball_x - Paddle_x) + \text{damping force}$$

$$Fy_{ball} = -K_y(Ball_y - Paddle_y) + \text{damping force}$$

where K is the spring constant for the paddle and "Ball" and "Paddle" are appropriate coordinates of these objects. The force on the paddle is preferably the equal and opposite force to the force applied to the ball.

The ball is considered to have disengaged with a paddle if the ball is engaged on one of the sides of the paddle and certain conditions then occur. If the ball is engaged on the left side of the paddle and $Bx+R \leq Px-W$ is true, the ball and paddle have become disengaged. If the ball is engaged on the right side of the paddle and $Bx-R \geq Px+W$ is true, the ball and paddle have become disengaged. In other embodiments, the disengagement from other sides of a paddle or other simulated object (such as left or right) can be implemented in a similar fashion.

Figure 12A:
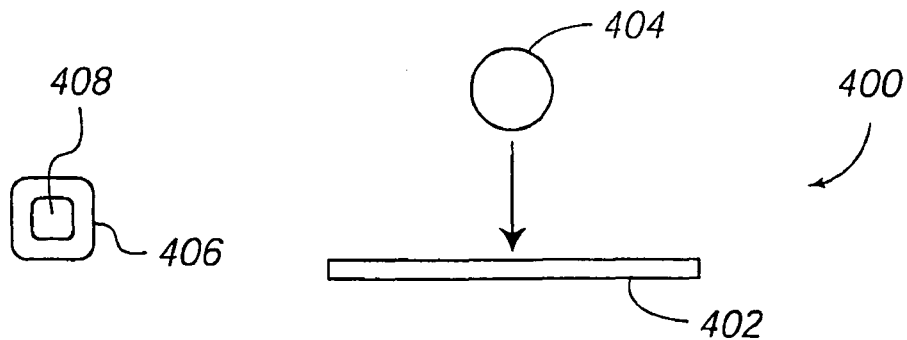
FIGS. 12a-c illustrate "catching" a ball in a paddle according to one embodiment of the present invention.
Figure 12B:
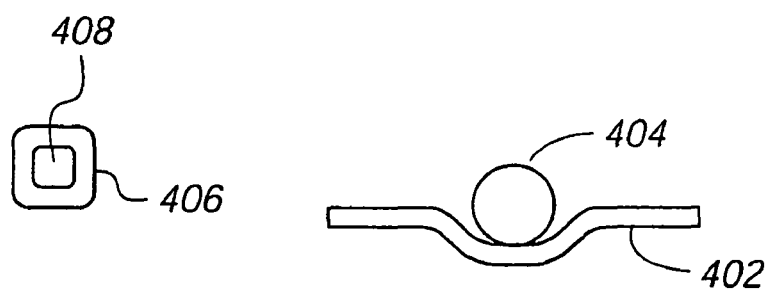
Figure 12C:
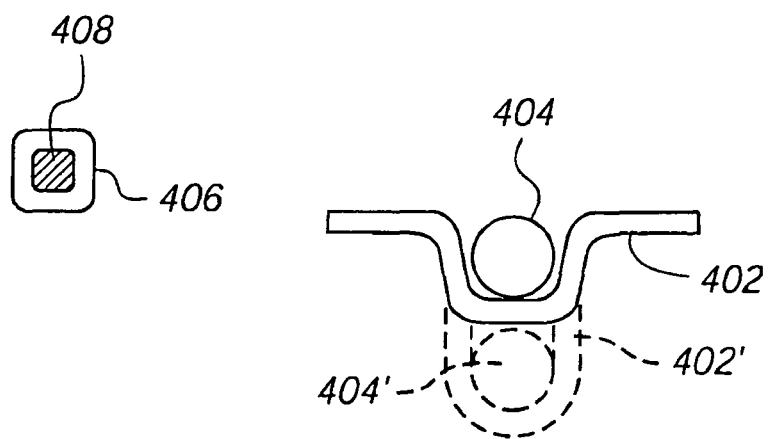

FIGS. 12a-c are diagrammatic illustrations of a ball and paddle interaction 400 in conjunction with the use of a user input device. This embodiment of the present invention allows a user to "catch" a ball and release the ball at a moment chosen by the user. For example, the interface device could be configured to include an input device such as a button, trigger, or the like, which, when depressed during a ball-paddle engagement, causes the ball to stop moving and remain engaged ("trapped") with the paddle. The ball can be released from the paddle when the button is released by the user, or, alternatively, by some other event within the simulation or by input from the interface device.

In one embodiment, the trapping holds the position of the ball and paddle in the configuration present at the moment the input device is activated. This is illustrated in FIGS. 12a-12c where paddle 402 engages ball 404. The paddle is controlled by an interface device shown at 406 which includes a button 408 for activating the holding mechanism of the invention. At FIG. 12a, the ball and paddle have not yet engaged. At FIG. 12b, the engagement is ongoing, but the button is not yet activated so the engagement continues unimpeded. At FIG. 12c, however, button 408 is activated to cause thereby a holding of the ball within the depression created in the paddle at the moment the activation occurred. In some embodiments, the appearance of the paddle and/or the ball can be changed when the button is activated (e.g., the color, shape, etc. of the paddle and/or ball can change). Dashed images of the paddle 402' and ball 404' illustrate the ball-paddle state had button 408 not been activated.

In one embodiment, the ball can be "carried" in the paddle (i.e., the paddle and ball moved freely) with all forces between the ball and paddle turned off and with the paddle becoming rigid (i.e., no longer compliant) until a second user-controlled event releases the ball from the paddle. For example, the user-controlled event can be the release of button 408, or an interaction with another object in some embodiments. When the ball is released, it is then launched from the paddle under a force which reflects the state of the ball and paddle at the time the holding action was initiated.

In one variation of this embodiment, upon release, the direction of the reaction force to the user is reversed from that which would have been provided by the simulation in the absence of the "freezing" the ball and paddle interaction. For example, if a ball and paddle are frozen in engagement while the ball is moving into the paddle, the direction of force is toward the paddle at that time. When the ball is released, the force between ball and paddle is the same as when the button was original pressed, but directed in the opposite direction, away from the paddle. Alternatively, the reversed forces upon release can be reduced in magnitude from the original force. Likewise, when the ball is moving away from a paddle when the ball and paddle are frozen, the direction of force is provided toward the paddle when the ball is released. These reversed forces produce a sensation that is perceived by the user to be correct when used in conjunction with the ball-holding mechanism described above.

In another embodiment, the ball can be carried in the paddle when a user input device is activated, but the forces of the ball-paddle interaction remain active and the paddle remains compliant, so that the ball and paddle behave as a flexible, loaded sling-shot. For example, one way to implement the sling shot is that when the button is pressed, the paddle can be treated as a point P having a position controlled by the user interface device. The ball can be considered attached to the point P by a simulated spring having a spring constant K, where the ball has a simulated mass M.

In multi-player embodiments, where each player controls a paddle, two or more paddles can be allowed to trap a ball at one time. For example, if the users trap a ball simultaneously, the ball is "attached" to both paddles, and the user can interact in a "tug of war" for the ball. If one player releases the ball, the ball can be catapulted into the other player's paddle, and that player can preferably feel the appropriate forces to such a collision. In an alternate embodiment of such a scenario, a dual-trapped ball can be "stolen" from one player if the stealing player exerts a predetermined amount or more of force on the user object to disengage the ball from the other player.

Figure 13A:
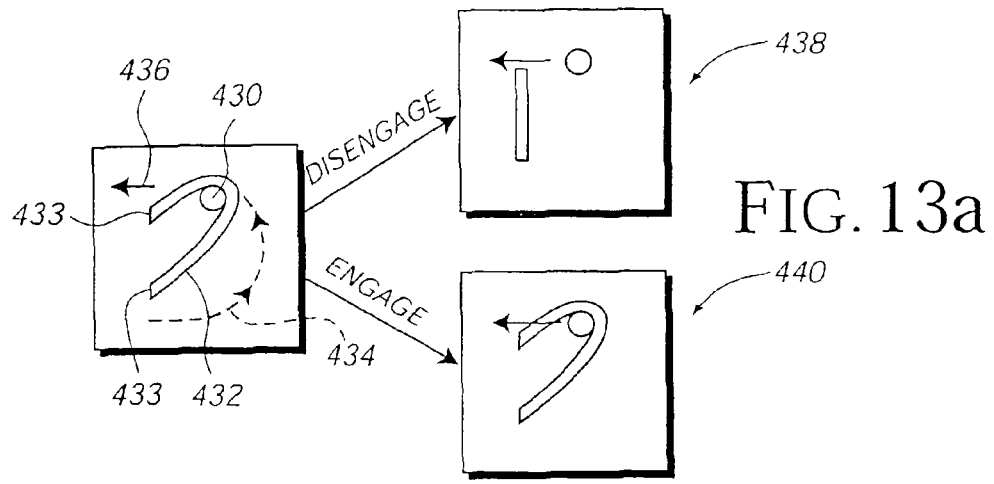
FIGS. 13a-c illustrate common situations and user-expected results of paddle-ball interactions.
Figure 13B:
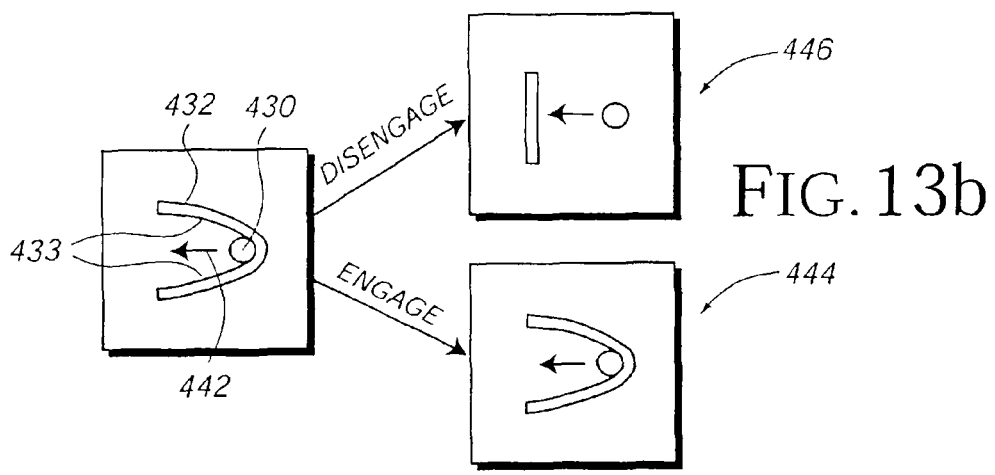
Figure 13C:
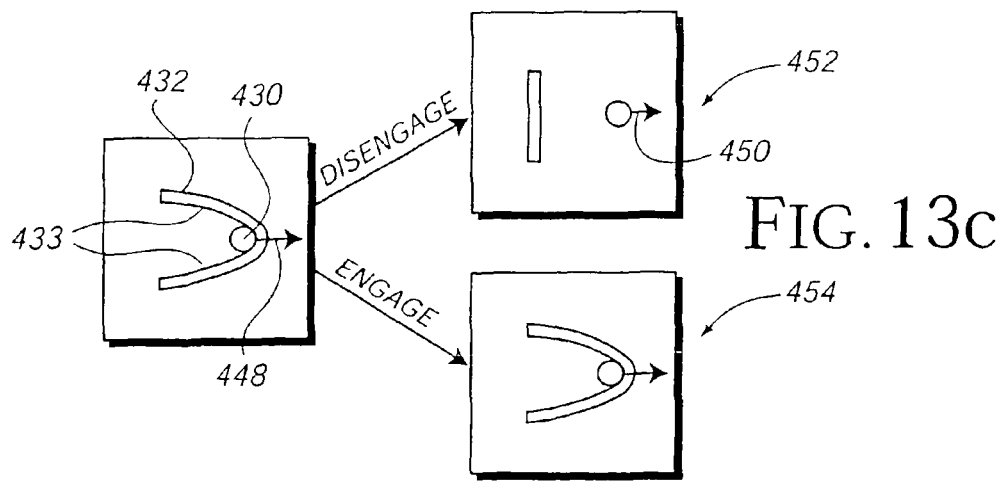

FIGS. 13a-c is a diagrammatic illustration of an example of implementing such a sling shot embodiment as referred to above. While the button is activated, the ball remains in contact with the paddle ("sling") so that the user can move the sling as desired. When the button is released, the ball disengages from the sling and moves in a particular direction. The user intuitively expects the ball to move in a particular direction depending on the movement of the sling.

FIGS. 13a-c show the intuitive expectation of the user and the non-intuitive expectation based on whether the ball is engaged or disengaged with the sling. To achieve the intuitive expectations of the user in sling-manipulation, and to avoid the situation where the ball becomes "tangled" in the sling against the user's wishes, the ball must either remain engaged or become disengaged from the sling in particular circumstances. Once such circumstance is shown in FIG. 13a, in which a ball 430 is being rotated in sling 432 in a direction 434. Alternatively, the user could be rotating the ball 430 in the opposite direction, or the ball 430 could be positioned on the other side of the endpoints 433 of the sling. When the user releases the button, he or she expects the ball to move in a direction indicated by arrow 436. To achieve this result, the ball must be disengaged from the sling when the button is released, as shown in the result 438. If the ball were to remain engaged with the sling, as shown in result 440, the ball would continue to move within the sling, which is a non-intuitive result. Another way to state this situation is that, if the paddle is rotating in the x-y plane so that the ball undergoes centrifugal acceleration, the release of the ball intuitively causes the ball to be released from the paddle and to move in the direction tangential to the motion of the paddle, as expected.

FIG. 13b shows a second situation in which ball 430 has been engaged with sling 432 and where the ball and sling are moving in the direction shown by arrow 442. The user intuitively expects that the ball will be carried forward by the sling when the button is released, as shown in result 444, since the sling should return to its non-stretched position. Therefore, the sling must remain engaged with the ball after the button is released to achieve this effect. If the sling were to become disengaged at this point when the button is released, the paddle would move forward at a faster rate than the ball or would instantly move back to its non-stretched position and the ball would end up behind the paddle, as shown in result 446. Such a result is not intuitive for the user. Another way to state this is that, if the ball is cradled in the paddle and is moving toward the original endpoints 433 of the paddle, release of the button intuitively should cause the ball to remain cradled in the paddle and be launched from the paddle in a motion akin to that of a catapult.

FIG. 13c shows a third situation in which ball 430 has been engaged with sling 432 and where the ball and sling are moving in the direction shown by arrow 448. If the user releases the button at this point, the user expects that the ball will be released from the sling and move in the direction of arrow 450 while the sling flexes back to its non-stretched position, as shown in result 452. To achieve this intuitive result, the sling must become disengaged from the ball when the button is released. If the sling were to non-intuitively remain engaged with the sling when the button is released, the ball would not be released, as shown in result 454. Another way to state this is that, if the ball is cradled in the paddle and is moving away from the original endpoints 433 of the paddle, release of the button should cause the ball to continue moving in the same direction away from the paddle.

To account for proper response in these situations, the following method can be used. First a determination is made as to whether the inequality $|B_y-P_y| \leq r+w$ holds. If so, then, if the ball is to the right of the paddle, and the ball's velocity is positive (in the coordinate system used in the simulation), the ball is disengaged (released) from the paddle. Otherwise, the ball remains engaged with the paddle. If the ball is positioned to the left of the paddle, and its velocity is negative, then the ball is also disengaged. Otherwise, the ball remains engaged. If the original inequality does not hold, then the ball is disengaged from the paddle.

Figure 14B:
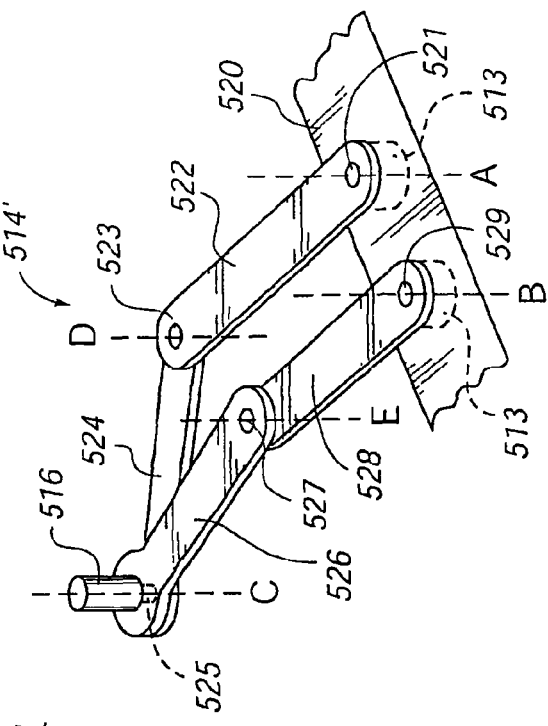
FIG. 14b shows a detailed view of a second embodiment of the force feedback interface device of the game system of FIG. 14.
Figure 14:
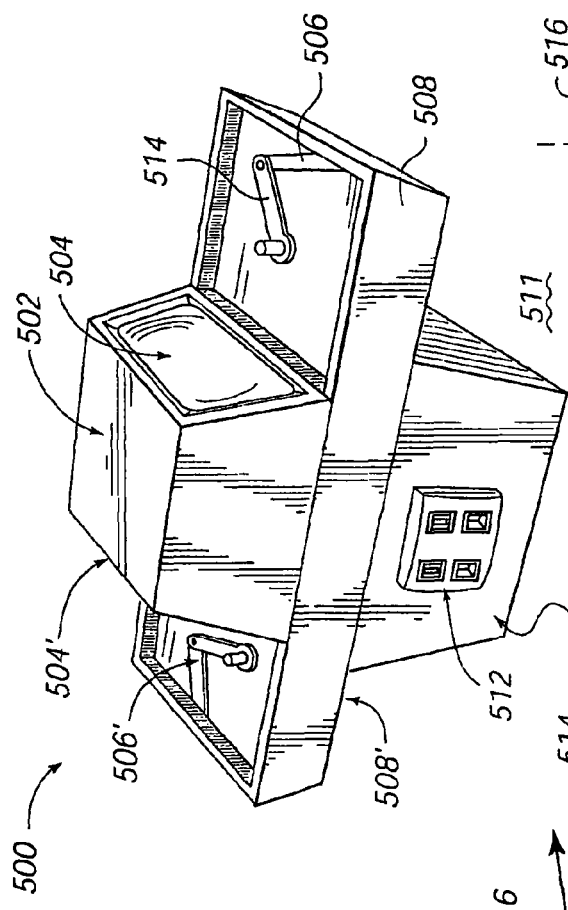
FIG. 14 illustrates a force feedback game system in accordance with the present invention.

FIG. 14 is a perspective view of a first embodiment of a game apparatus 500 which can employ the above-described, single controller or multi-controller force feedback embodiments. Game apparatus 500 is one embodiment of a video game for two players. The game apparatus comprises a housing 502 which display devices 504 and 504' through which opposing players view a computer-generated simulation while operating interface devices 506 and 506' respectively. For example, the simulation can be the above-described paddle game embodiment illustrated in FIGS. 5a-5b (especially FIG. 5b), where a view of the simulated playing area, paddles, and "puck" is provided. A variety of other types of games can also be displayed.

Figure 14A:
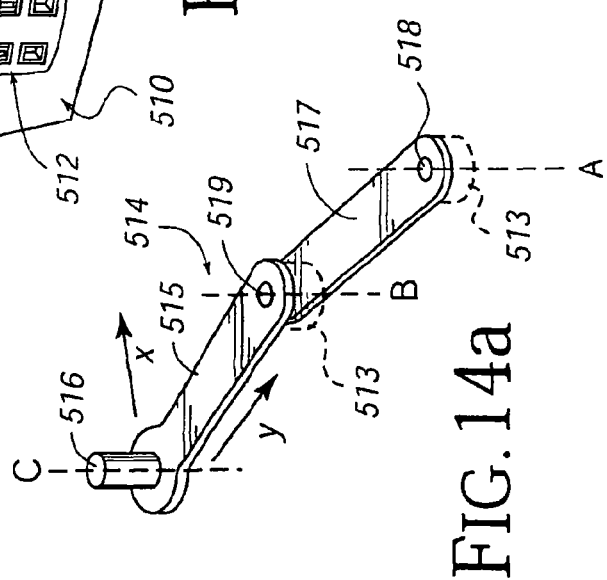
FIG. 14a shows a detailed view of one embodiment of the force feedback interface device of the game system of FIG. 14.

Interface devices 506 and 506' are shown as mechanical arms 514. FIG. 14a shows a detailed view of one embodiment of interface device 506, 506' having an arm linkage 514 and a handle 516 for a player to grasp. Joint 518 is provided at the base of link member 517 and joint 519 is provided between the two link members 517 and 515 such that linkage 517 can rotate about fixed (grounded) axis A and linkage 515 can rotate about floating axis B. This configuration allows handle 516 to be moved in a plane defined by the x and y axes, i.e., handle 516 has two degrees of freedom in a planar workspace.

Preferably, actuators 513 and sensors 513 are provided at joints 518 and 519 to implement force feedback for the user and to track the position of handle 516 in the planar workspace. This device is suitable for moving a paddle in the paddle-ball embodiments described above. Also, additional degrees of freedom can be provided. For example, handle 516 can be allowed to rotate about axis C to provide a "spin" degree of freedom. Furthermore, in other embodiments, handle 516 can be provided with linear degrees of freedom rather than rotary degrees of freedom.

FIG. 14b is a detailed view of an alternate embodiment 514' of interface device 506 and 506' having a 5-member linkage. A ground member 520 is grounded (e.g., coupled to a stable base such as game apparatus 500). First base member 522 is rotatably coupled to ground member 520 at joint 521 and can rotate about fixed axis A, and an actuator 513 is coupled to joint 521 to cause forces on member 520 about axis A. A first end of first link member 524 is rotatably coupled to first base member 522 by a joint 523, allowing first link member 524 to rotate about floating axis D. A first end of second link member 526 is rotatably coupled to a second end of first link member 524 by a joint 525. The second end of second link member 526 is coupled to second base member 528 at a joint 527, allowing second link member 526 to rotate about floating axis E. The other end of second base member 528 is coupled to ground member 520 at a joint 529 to allow member 528 to rotated about a fixed axis B, and where a second actuator 513 is coupled to cause forces on member 528 about fixed axis B. Handle 516 is rigidly coupled to second link member 526 (or, alternatively, to first link member 524). Alternatively, handle 516 can be rotatably coupled to a link member to allow a third rotary degree of freedom of the handle about axis C. Sensors (included at 513) are also preferably included at axes A and B to track the position of handle 516 in the planar workspace.

A significant advantage of the five-member linkage 514' is that both actuators 513 (as well as the sensors) are coupled to ground member 520, i.e., neither actuator is floating. Thus, the user does not have to carry the weight of the actuators or sensors when manipulating handle 516, which significantly adds to the realism of the forces experienced when using interface device 506 or 506'.

Referring back to FIG. 14, the interface devices 506 and 506' are supported on a platform 508 and a base 510 so that the two players can stand while moving the interface devices in substantially planar motions. The floor 511 on which the game apparatus 500 is supported can optionally include sensors at positions where the players stand when playing the game. Such sensors can sense a player's position or weight to allow a player to provide further input to the simulation implemented on game apparatus 500, as described below with reference to FIG. 19.

It will be appreciated that the illustrated embodiment can be used in a video arcade or the like. In such a case, one of more coin slots can be provided such as those shown at 512 to accept standard currency, game tokens, bills, credit cards, debit cards, or other monetary input before the players are allowed to play a game, the implementation of which is well known to those skilled in the art. In addition, the game apparatus 500 (as well as the game apparatuses discussed subsequently) can be linked with other game apparatuses or computer systems, e.g., through a network such as a local area network, wide area network, wireless network, the Internet, or other communication link. Thus, a plurality of players can participate in a single simulation that is implemented concurrently by several game apparatuses. One embodiment of linked computer systems is described below with reference to FIG. 20.

The game apparatus of FIG. 14 allows a player to naturally and skillfully participate in sporting simulations and other similar simulations. Device 506 allows planar movement of handle 516 which naturally corresponds to movement of paddles and other objects having a position control mapping. Thus, interface device 506 is more appropriate to several types of sporting simulations than other interface devices such as joysticks and steering wheels, which are more appropriate for rate control embodiments.

Figure 15:
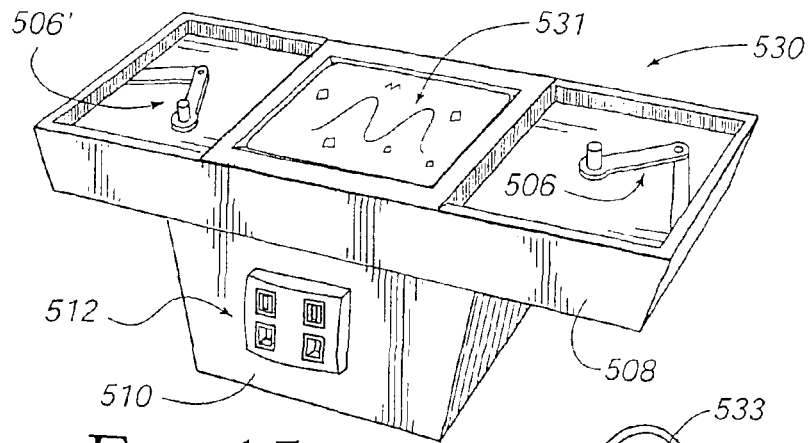
FIG. 15 illustrates a first alternate embodiment of the force feedback game system of FIG. 14.

FIG. 15 shows an alternative embodiment 530 of the game apparatus of the present invention. Game apparatus 530 includes a two-dimensional display 531 in place of the dual displays 504 and 504' of FIG. 14. In this embodiment, the players can view on a single screen a view of the playing area, paddles, and "puck" from a position directly above the playing area. Game apparatus 530 is thus well-suited for implementing a paddle-ball style game and similar games as described above in the third-person perspective as shown in FIG. 5a.

Figure 16:
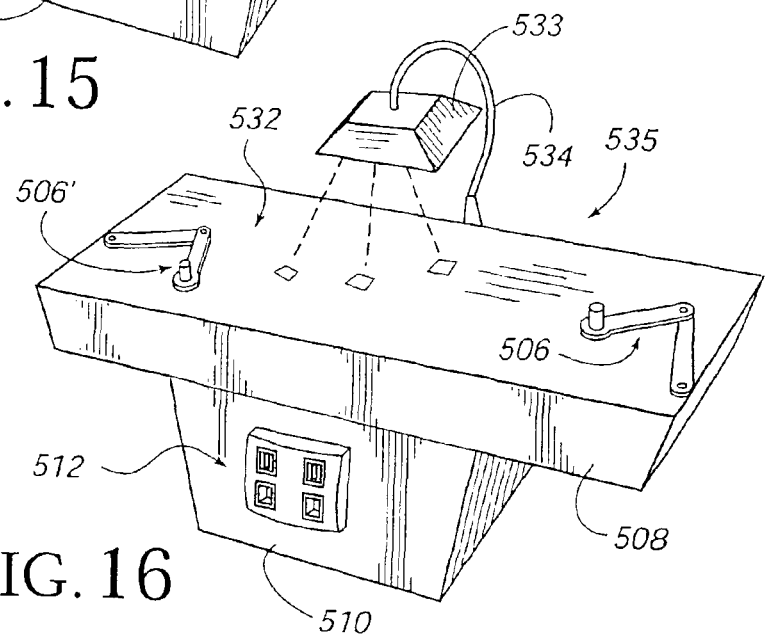
FIG. 16 illustrates a second alternate embodiment of the force feedback game system of FIG. 14.

FIG. 16 shows an alternative embodiment 535 of the game apparatus of the present invention in which display 528 is replaced with a projected display. A projector 533 which is supported by arm 534 can be provided to project an image onto the area 532 of the game apparatus. For example, when implementing the paddle-ball game described above, the playing field, paddles, and "puck" are projected on the area shown generally at 532 from projector 533. Projector 533 can be a video projector for projecting video images from a raster display or similar display. Alternatively, projector 533 can be a liquid crystal diode (LCD) projector or a laser projector. In alternate embodiments using a laser projector, laser images can be projected on other surfaces or areas besides game apparatus 530. For example, laser-projected images of a ball and paddle can be displayed on a wall, ceiling, building, or other structure.

One advantage of the projector embodiment 535 is that, in some embodiments, displayed images can visually and directly interact with a user object manipulated by the user. For example, the projected images can be displayed directly onto the planar workspace of the interface device 506 and 506' such that the user is moving the user object among the images. In one example, the user could move the physical handle 516 of an interface device directly into a projected image of a wall, and the user would feel forces on the handle as if the wall image were a physical object that the handle could not be moved through. This allows a greater sense of immersion into the simulation.

Figure 17:
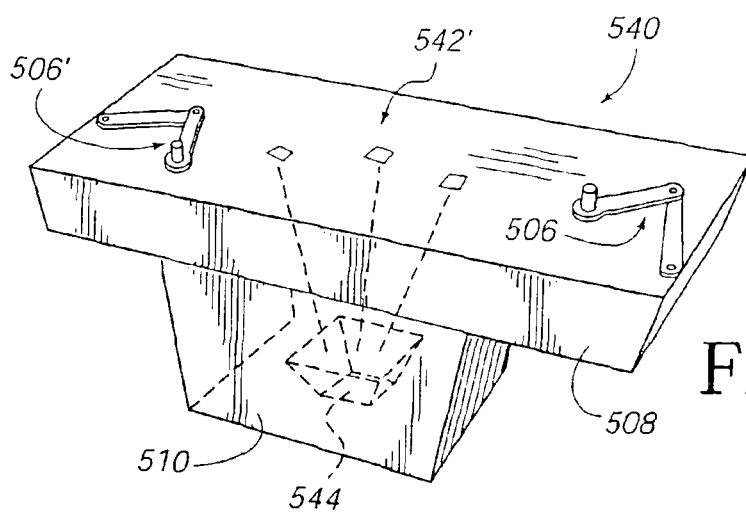
FIG. 17 illustrates a third alternate embodiment of the force feedback game system of FIG. 14.

FIG. 17 illustrates a "reverse projection" embodiment 540 of the game apparatus of the present invention. Images, such as the playing area, paddles, and "puck" of the paddle game embodiment, are projected at a top surface 532 from a projector 534 which is located beneath the top surface of the game apparatus. Preferably, the top surface of the game apparatus is semi-transparent to allow the images to distinctly appear on the surface 532 to the players. For example, a clouded Lucite or similar type of material can be used for top surface 532. This embodiment may in some circumstances be more suitable for public areas than the embodiment of FIG. 22, since the projection equipment is protected from damage within the interior of the game apparatus. In addition, if a laser projector is being implemented as projector 534, this embodiment can be more safe for users since it protects the eyes of users from direct exposure to directed laser beams used in the display of images.

Figure 18:
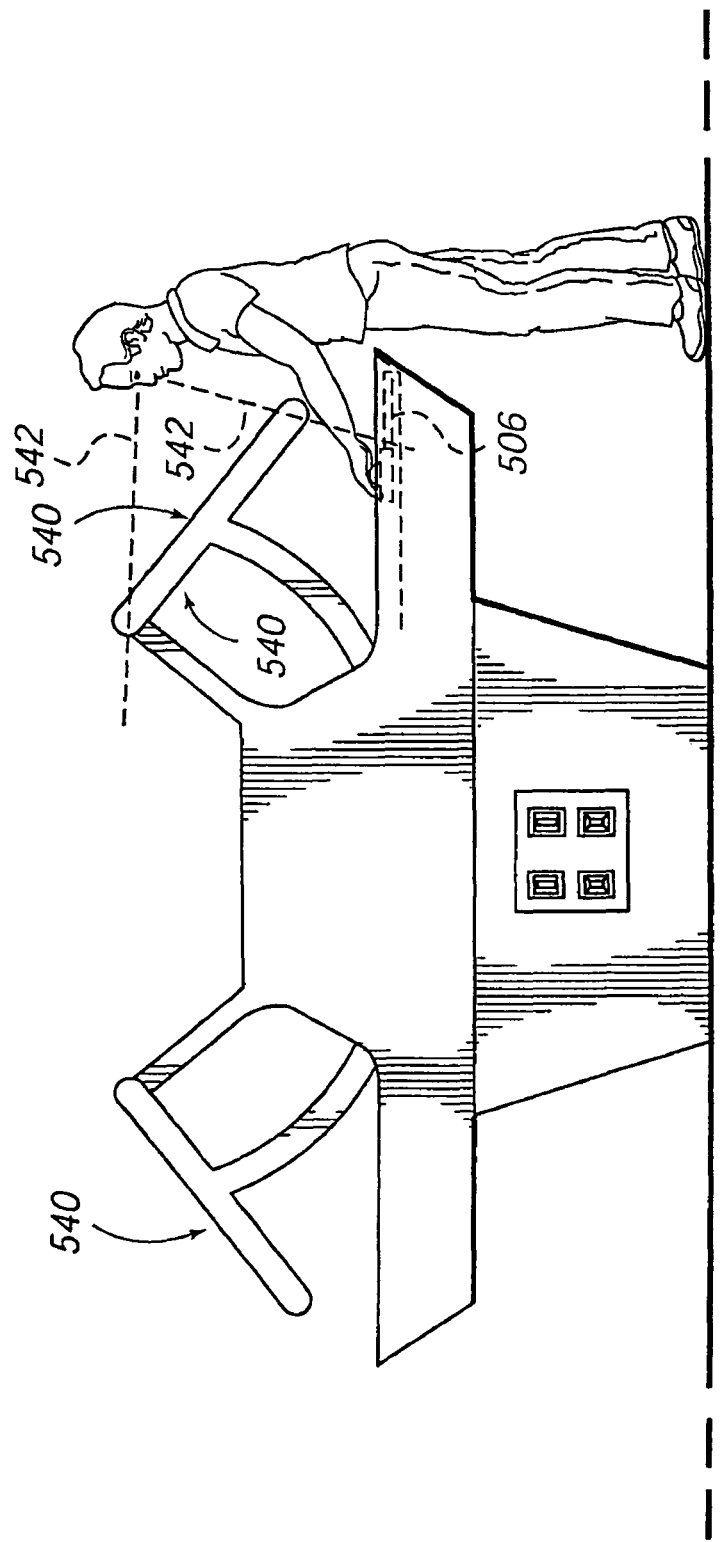
FIG. 18 illustrates an alternate embodiment of the force feedback game system where the user's hands are concealed.

FIG. 18 is a side view of an alternative embodiment of the game apparatuses of FIGS. 14-17 in which the interface devices manipulated by the players are hidden from view. A user operates the interface device 506 while standing at the position shown. A display device 540, such as a flat panel display, LCD display, CRT, or other display device, is oriented such that the user can easily view the display. In addition, the user object of the interface device is preferably manipulated by the user behind or underneath the display device so that the user cannot view his or her hand and the physical object that he or she is manipulating. The dashed lines 542 indicate the extent of the user's vision. Preferably, the simulated object which the user is controlling is displayed in roughly the same position as the user perceives his or her hand, i.e., when the user looks at the controlled simulated object, his or her hand will be approximately below or behind that displayed simulated object.

The concealment of the user's hand and the interface device from the user's view helps provide a sense of "presence" and immersion within the simulated environment with which the player is interacting. This presence is facilitated by a "natural" mapping between hand motion and the motion of the user-controlled simulated object. Thus, as in a position control paradigm, when a player moves a physical object of the interface device to the left, the player views the simulated object moving to the left in an equivalent distance and begins to feel a sense of self within the simulation. One impediment, however, to the feeling of presence in the simulation is what is referred to herein as a "dual localization" resulting from both the physical object and the simulated object being visible to the player at any give time. There is a perceptual conflict if the player can see both the simulated object within the simulation and a physical object and hand located outside the simulation. One way to reduce the dual localization effect and to enhance the player's immersion in the simulation is to conceal the user's hand and the physical object from the player's view. This allows the user to have physical interaction with the simulated object through mechanical input and force feedback, but the player only views one object: the object in the simulation. By having the position of the player's hand roughly correspond to the position of the controlled simulated object, the sense of presence is further increased.

Figure 19:
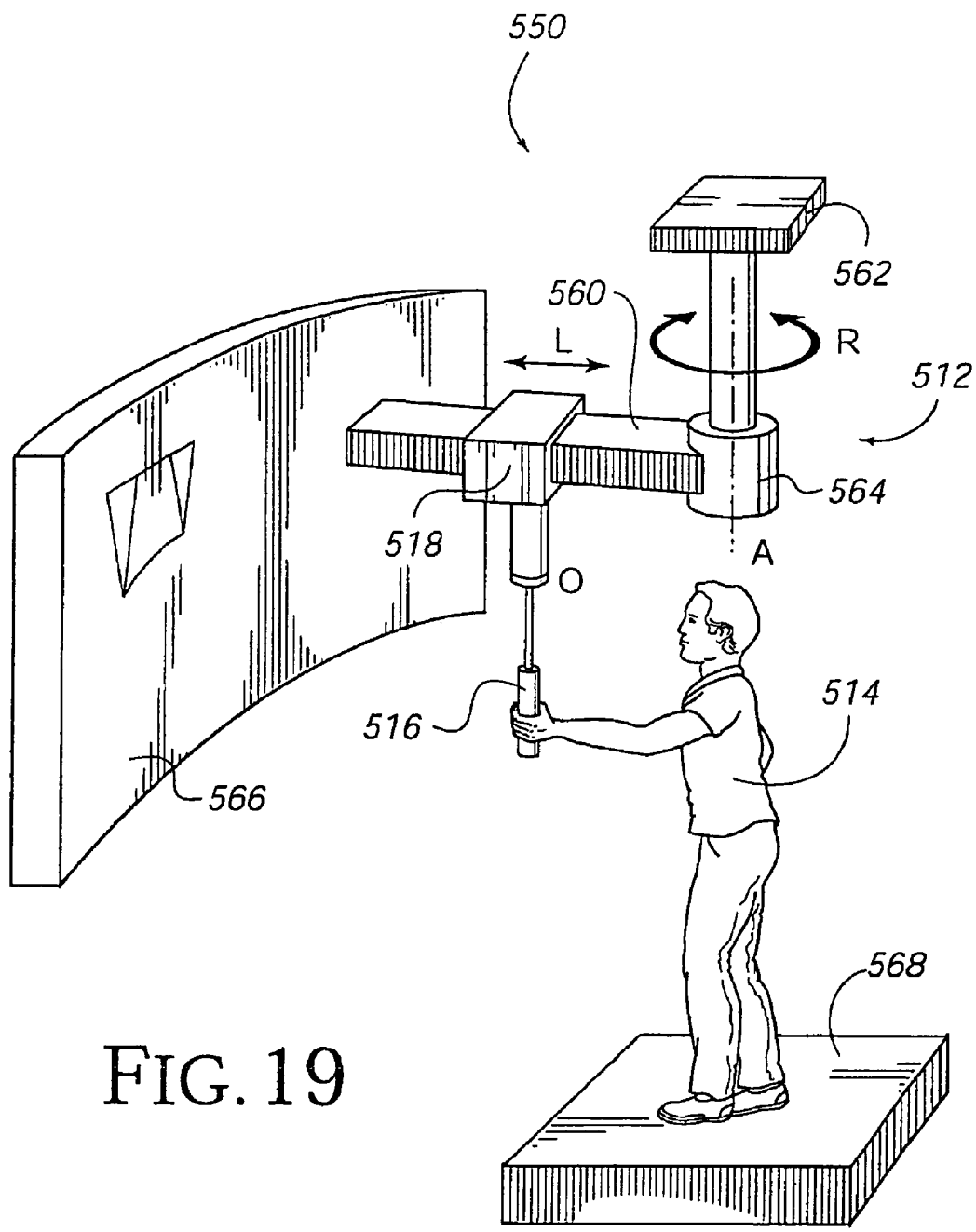
FIG. 19 illustrates a "racquet" input device in accordance with one embodiment of the present invention.

FIG. 19 is a perspective view of an interface device 550 of the present invention suitable for use in the sporting and other force simulations disclosed herein. Interface device 550 is a racquet-like user interface which can be provided to users to create a better feel and interaction for sports-style simulations and games. Racquet interface device 552 is operated by a user 554 who wields a user object that is a grip 556, which, in one embodiment, is similar to a grip or handle of a tennis racket or the like. Grip 556 is coupled to a slider 558 which translates along a support 560 to allow the user control of a computer-generated simulated object in a linear degree of freedom as indicated by the double arrow labelled "L." Support 560 is pivotably coupled to a second support 562 by a coupling 564 to allow the user control, indicated by the arrows labelled R, in a rotary degree of freedom over the simulated object about an axis A. Thus, the handle 556 may be swept within a planar workspace about the user 554. Preferably, a linear sensor senses the position and/or motion of the grip 556 in linear degree of freedom, and a rotary sensor senses the position of the grip 556 in the rotary degree of freedom. Similarly, actuators are provided to generate forces on grip 556 in the two provided degrees of freedom. Such sensors and actuators can be implemented in a variety of ways, some of which are referred to above with respect to FIG. 1. In alternate embodiments, additional sensors and/or actuators can be included to provide forces and sense movement in other degrees of freedom. A 5-bar planar device, such as the device described above with reference to FIG. 14b, can alternatively be used to allow the actuators to be grounded so that the user need not carry the weight of the actuators.

An origin O is preferably designated on the grip 556, where O is defined to be the point on the interface device which is sensed in the two degrees of freedom and the point at which forces are generated on the grip 556. Origin O thus represents the point on grip 556 which hits simulated objects, such as balls or pucks, within the simulation. In one preferred embodiment, the movement of slider 558 along support 560 is limited such that the origin O cannot be moved to within a predetermined distance of axis A, such as about 15-20 inches. In this way, a safe region is inherently defined directly underneath axis A in which the force feedback interface device 550 cannot enter. If the user stands within this region, the user cannot be struck in the head by the racquet mechanism.

While the location of the origin 0 can be constrained to the planar workspace defined by the above-described two degrees of freedom, the grip need not be constrained to this planar workspace. For example, grip 556 can be allowed to vary its orientation (i.e., roll, pitch, yaw) about origin O. This can be accomplished using, for example, a universal joint, such as a ball joint. In some systems, such orientation movement can be sensed by appropriately-placed sensors and provided with force feedback using actuators; in other systems, some or none of the orientation movement need be sensed and/or provided with forces. Such orientation movement allows the user to manipulate grip 556 in a more natural fashion. In yet other embodiments, a telescoping grip 556 can be included to provide an additional linear degree of freedom for the user; and such a telescoping degree of freedom can be sensed by sensors, if desired.

In the illustrated embodiment, the user views the simulation using display device 566 and controls the simulated paddle while positioned on a stage 568. Stage 568 can be a simple platform, or can include sensors and/or actuators that are responsive to the motions of the user and/or simulated events to provide a greater degree of immersion. For example, in one embodiment, when the user shifts his or her weight on stage 568, the computer can record this movement with sensors and update the simulation in accordance with this movement. Such sensors are well known to those skilled in the art, and can be included in stage 568 or can be external to the interface device, such as optical or video sensors. Alternatively, the user can move his or her feet to different positions on the stage 568 and the sensors can record these positions, where various foot configurations or sequences can correspond to commands to interact with the simulated environment.

For instance, the computer can provide a simulated player object associated with a simulated paddle, e.g., the player object can be holding the simulated paddle in the player object's simulated hand. If the user leans to the left, the computer can move the simulated player object and the paddle to the left, and so on. A preferred embodiment allows a player object to move within a simulation "space" based on a rate control paradigm controlled by the user's movement on stage 568. For example, in a simulated tennis game, the player could lean left to move to the other side of a simulated tennis court; the degree of lean could indicate the magnitude of velocity of movement within the simulated environment. Meanwhile, the paddle can interact with a tennis ball object using a simulated racquet when the user manipulates grip 556 using a position control paradigm. This embodiment can be considered having global rate control (move location of body through global simulated space) and a local position control (moving a racquet or arm through local simulated space relative to the player object).

Figure 20:
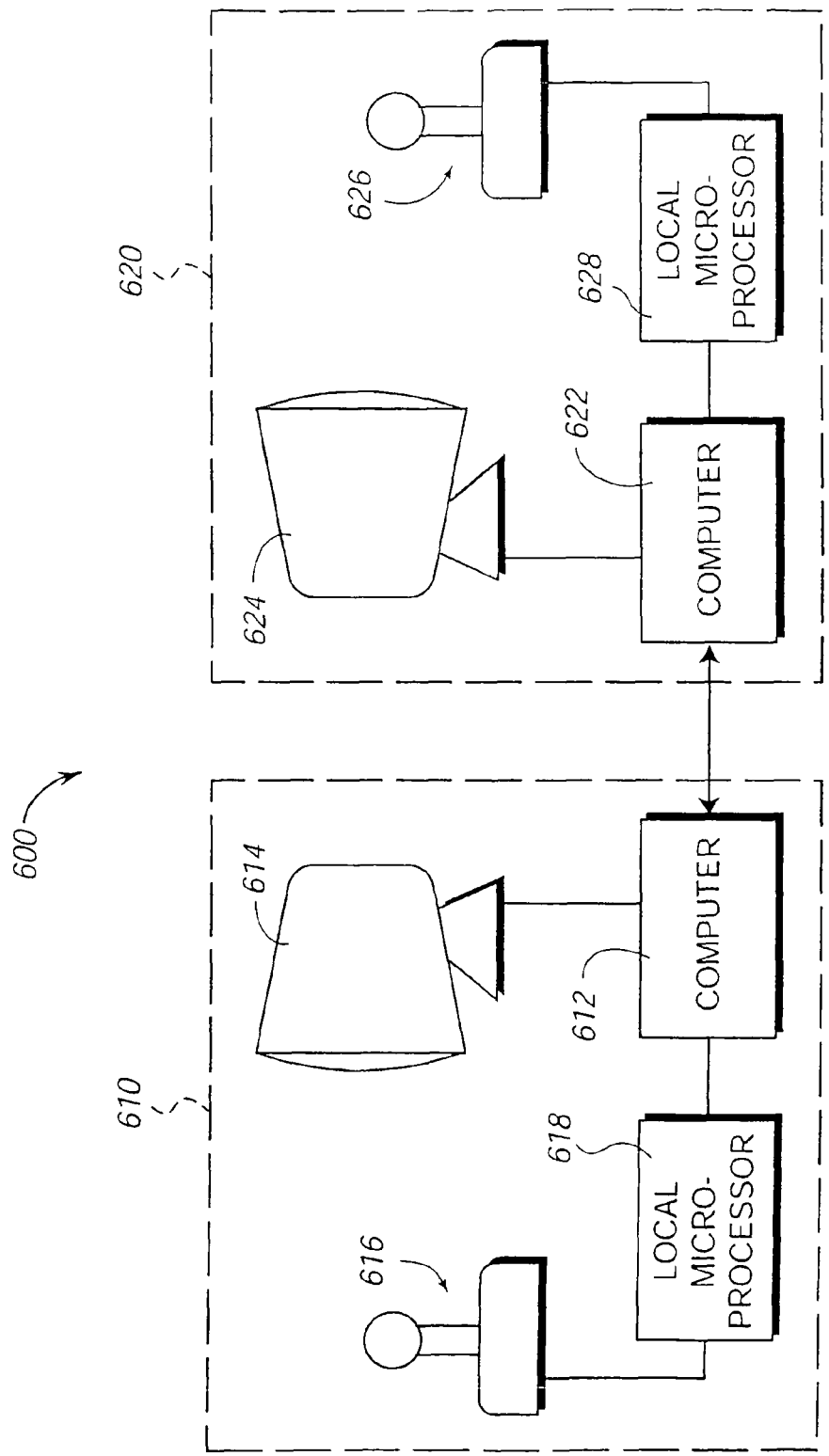
FIG. 20 is a block diagram illustrating a computer network of interface devices and computers of the present invention.

FIG. 20 is a schematic diagram of a multi-computer network system 600 used for implementing the force feedback simulations of the present invention. It will be appreciated from the discussion above that two or more such simulations can be linked together, e.g., over a computer network, to provide multi-user interactions and competition involving two, three or more players. Also, the use of computer networks can allow two or more remote players to interact in the same simulation.

In one embodiment, a first site 610 includes computer 612 that implements the simulation and a first user utilizes display device 614 and force feedback interface device 616. Optionally, local microprocessor 618 is coupled to interface device 616 as described with reference to FIG. 1. At a second site 620, computer 622 implements the simulation, display device 624 displays images to a second user, force feedback interface device 626 interacts with the second user, and local microprocessor 628 can optionally be included. The first site is a "remote" site with reference to the second site, and vice versa. Each computer 612 and 622 implements a local model of the simulation so that each display device 614 and 624 displays a local model of, for example, the playing field, puck, and paddles of the paddle game described above. Additional users and computers that implement the simulation can be included in the network system 600 similarly to the systems described.

Each local computer 612 and 622 has direct access to its own interface device 616 and 626, respectively, but does not have direct access to the remote interface device used by the other user. Thus, the information which describes the position, orientation, other motion or state characteristics, button data, and other information related to each local interface device (collectively considered "motion/state information" herein) is conveyed to the other remote computer. Each local computer 612 and 622 therefore has direct access to the local interface device and networked access to the motion/state information of the remote interface device, allowing a consistent simulation and interaction for both users.

The computers 612 and 622 need only exchange the information that is necessary to update the simulated objects controlled by the remote users and other simulated characteristics that may have been affected by the input of a user. This minimal information exchange is often necessary when using networks having low or limited bandwidth and which have a slow rate of information transfer, such as the current implementation of the Internet/World Wide Web which is often implemented with low bandwidth telephone lines and accessed by users with relatively low-bandwidth modems or other interface devices. The computationally-intensive force feedback calculations to implement the interactions between a user-controlled simulated object (e.g. paddle) and other objects (e.g., a wall, ball, or other paddle) are preferably handled locally. The resulting outcome of the force feedback calculations/interactions are transmitted to remote users so as to minimize the information that is transmitted to other computer systems. For example, when a puck interacts with a paddle controlled by a local user, the local computer processes the paddle-puck interaction, generate the required local force feedback sensations, compute the new location and velocity of the puck as a result of the interaction, and convey the new puck information to the remote computer(s) so that all simulations can be re-coordinated after the paddle-puck interaction. The remote computer would then compute any force feedback sensations occurring at its own site resulting from the new puck position, motion, etc.

When using a network having low- or limited- bandwidth, there may still be a substantial time delay from when a local simulated object, such as a paddle or puck, changes its location/motion/state information and when the remote simulations receive and are updated with that information. Thus, a user at a given site may be viewing an opponent-controlled simulated object at a time delay while viewing his own paddle in real time without a time delay. For example, the user may witness a simulated paddle/ball interaction a few seconds after the actual even happened on his opponent's local implementation of the simulation. Obviously, this can cause problems in the experience of networked game play and simulation interaction. To compensate for this problem, a networked simulation or game may include a short time delay before events occur locally. For example, a short delay can be implemented on the local computer before a ball bounces off of a paddle to reduce the timing discontinuity between remote and local users.

While this invention has been described in terms of several preferred embodiments, it is contemplated that alterations, modifications and permutations thereof will become apparent to those skilled in the art upon a reading of the specification and study of the drawings. For example, many different types of sporting simulations and other similar simulations can be implemented with the present invention. Also, different types of forces can be applied to the user object 34 in accordance with different simulated objects or events implemented by the computer system. In addition, many varieties of simulated objects can be provided under user control or computer control, and these simulated objects can be manipulated using a variety of type of mechanical interface apparatuses. Furthermore, certain terminology has been used for the purposes of descriptive clarity, and not to limit the present invention. It is therefore intended that the following appended claims include all such alterations, modifications and permutations as fall within the true spirit and scope of the present invention.

The invention claimed is:

1. An interactive electronic combat game apparatus comprising:
   a processor configured to execute a program of an interactive combat game, wherein the processor is adapted to display a graphical environment of a battle on a display device;
   a first weapon having a handle configured to be grasped by a first user, the first weapon moveable in a plurality of spatial dimensions with respect to the first user;
   a sensor coupled to the first weapon and configured to track movement of said weapon handle in the plurality of spatial dimensions and provide sensor signals to the processor, wherein the processor is configured to update a first simulated object representative of the first weapon in response to the sensor signals; and
   an actuator coupled to the first weapon and configured to output a haptic effect in response to receiving an activating signal from the processor after the processor determines a trajectory of the simulated image is to intersect with a second simulated object in the graphical environment;
   wherein the processor is configured to perform position control mapping of movement of the first simulated object with the tracked movement of the first weapon so that movement of the first simulated object in the environment of the battle is in response to and based on displacement of the first weapon from a first location in space to a second location in space.

2. The apparatus of claim 1 further comprising:
   a second sensor coupled to said processor, said second sensor configured to operate in conjunction with said first sensor to determine a position or movement of said first weapon.

3. The apparatus of claim 2 further comprising:
   a third sensor coupled to said controller, said third sensor configured to operate in conjunction with said first and second sensors to determine a position or movement of said first weapon.

4. The apparatus of claim 1 wherein said second simulated object has one or more boundaries such that said second simulated object impedes motion of said first simulated object when the trajectory of said first simulated object intersects said boundaries of said second simulated object.

5. The apparatus of claim 4, wherein said position control mapping between said first weapon and said first simulated object is broken during said intersection.

6. The apparatus of claim 5 wherein the tactile feedback includes a restoring force that is proportional to a magnitude by which said mapping is broken when said first simulated object intersects said one or more boundaries of said second simulated object.

7. The apparatus of claim 6 wherein said restoring force is a spring force having the mathematical form: $F=kx$ where $F$ is said restoring force, $x$ is a magnitude of a deviation of said spatial correlation including a deviation between the current location of the first simulated object and a location of said first simulated object had said mapping not been broken, and $k$ is a spring constant parameter.

8. The apparatus of claim 6 wherein said restoring force includes a damping force and said restoring force has the mathematical form: $F=kx+bv$ where $F$ is said restoring force, $x$ is a magnitude of a deviation of said spatial correspondence including a deviation between a current location of the first simulated object and a location of said first simulated object had said mapping not been broken, $v$ is a function of a velocity of said weapon handle, and $k$ and $b$ are constant parameters.

9. The apparatus of claim 4 further comprising a second weapon having a handle configured to be grasped by a second user, the second weapon moveable in a plurality of spatial dimensions with respect to the second user, wherein the second weapon corresponds to said second simulated object.

10. The apparatus of claim 6 wherein said restoring force includes a weighting factor such that the location L on said display device of the simulated objects shown on said display device is determined by the equation: $5L = (w1\ x1+w2\ x2)(w1+w2)$.

11. The apparatus of claim 1 wherein the interactive electronic combat game is a sword game.

12. An interactive electronic game apparatus comprising:
   a display device for displaying images corresponding to an interactive electronic game;
   a user object having a handle configured to be grasped by a user and moveable in three dimensions with respect to the user; and
   a processor operationally coupled to the display device and the user object, the processor configured to execute a program for the interactive electronic game, wherein a first simulated object representative of the user object is displayed on the display device;
   a sensor configured to track movement of the user object in the three dimensions and provide sensor signals to the processor, wherein the processor is configured to update the first simulated object on the display device based on the three-dimensional tracking and using a position control mapping; and
   an actuator coupled to the user object, wherein the actuator is configured to output a haptic effect upon receiving an activating signal from the processor, the activating signal based on a determination that a trajectory of the first simulated object will intersect with a second simulated object on the display device.

13. The apparatus of claim 12 wherein the user object is a sword hilt.

14. The apparatus of claim 12 wherein the user object is a mace, staff, or a spear.

15. The apparatus of claim 12 wherein the user object is at least a portion of a weapon.

16. An apparatus for allowing a user to interact with a computer-generated simulation, the apparatus comprising:
- a processor configured to implement a computer-generated simulation, said simulation including a first simulated object;
- a display device coupled to said processor configured to display said first simulated object; and
- a force feedback interface device coupled to said processor and including a physical user object which is grasped by a user, said user object being movable in a planar workspace corresponding to a simulated plane within said simulation to move said first simulated object within said simulation according to a position control mapping, and wherein said processor is operative to command forces output to said user via said force feedback interface device,
- wherein movement of the first simulated object in the simulation is in response to and based on displacement of the user object from a first location in the plane to a second location in the plane.

17. The apparatus as recited in claim 16 wherein a plurality of users operate said apparatus, and wherein said display device includes a plurality of display screens such that each user views an associated display screen.

18. The apparatus as recited in claim 16 wherein said display device includes a projection device configured to display images upon a surface.

19. The apparatus as recited in claim 18 wherein said projection device is a front-projection device positioned on the same side of said surface as said images displayed on said surface.

20. The apparatus as recited in claim 18 wherein said projection device is a rear-projection device positioned on the opposite side of said surface to said images displayed on said surface.

21. The apparatus as recited in claim 16 wherein said force feedback interface device includes a first link and a second link, said first link being rotatably coupled to ground and said second link being rotatably coupled to said first link, and wherein said user object is coupled to said second link.

22. The apparatus as recited in claim 16 wherein said force feedback interface device includes a five member linkage.

23. The apparatus as recited in claim 22 wherein said five member linkage includes a first link coupled to a ground, a second link coupled between said first link and said user object, a third link coupled to said ground, and a fourth link coupled between said third link and said user object.

24. The apparatus as recited in claim 16 wherein said user object can be moved in a first and second degree of freedom rotary degree of freedom, and wherein a displayed orientation of said first simulated object is changed according to movement of said user object in said rotary degree of freedom.

25. The apparatus as recited in claim 16 wherein said user object comprises a sword hilt.

26. The apparatus as recited in claim 16 wherein said interface device includes a slider coupled to said handle configured to move said handle in a linear degree of freedom along a support, said support being rotatably coupled to a ground member for moving said handle in a rotary degree of freedom.

27. The apparatus of claim 1 wherein the sensor further comprises an accelerometer.

28. The apparatus of claim 1 wherein the processor is located within a host computer, wherein the sensor signal and the activating signal are wirelessly communicated between the first weapon and the host computer.

29. The apparatus of claim 12 wherein the sensor further comprises an accelerometer.

30. The apparatus of claim 12 wherein the processor is located within a host computer, wherein the sensor signal and the activating signal are wirelessly communicated between the user object and the host computer.

* * * * *